United States Patent
Jackson et al.

(10) Patent No.: US 10,943,317 B2
(45) Date of Patent: Mar. 9, 2021

(54) SYSTEMS AND METHODS FOR MULTI-MODE COMMUNICATION MANAGEMENT

(71) Applicant: Relola Inc., Emeryville, CA (US)

(72) Inventors: Heather Sittig Jackson, Oakland, CA (US); Kristen Policy, Berkeley, CA (US); Graham Golder, Fremont, CA (US)

(73) Assignee: Relola Inc., Emeryville, CA (US)

( * ) Notice: Subject to any disclaimer, the term of this patent is extended or adjusted under 35 U.S.C. 154(b) by 0 days.

(21) Appl. No.: 15/178,355

(22) Filed: Jun. 9, 2016

(65) Prior Publication Data

US 2017/0024836 A1    Jan. 26, 2017

Related U.S. Application Data

(60) Provisional application No. 62/173,347, filed on Jun. 9, 2015.

(51) Int. Cl.
*G06Q 50/16* (2012.01)
*H04W 4/21* (2018.01)
(Continued)

(52) U.S. Cl.
CPC ..... *G06Q 50/167* (2013.01); *G06F 16/24578* (2019.01); *H04L 51/12* (2013.01);
(Continued)

(58) Field of Classification Search
CPC ....... G06Q 30/02; G06Q 50/16; G06Q 50/167
See application file for complete search history.

(56) References Cited

U.S. PATENT DOCUMENTS

| 6,684,196 B1 * | 1/2004 | Mini | G06Q 30/02 705/14.34 |
| 2006/0241963 A1 * | 10/2006 | Walker | G06Q 30/02 705/313 |

(Continued)

FOREIGN PATENT DOCUMENTS

WO    2012000107    1/2012

OTHER PUBLICATIONS

Suterwala (Year: 2012).*

(Continued)

*Primary Examiner* — Aryan E Weisenfeld
(74) *Attorney, Agent, or Firm* — Ahmann Kloke LLP

(57) ABSTRACT

Systems and methods for multi-mode communication management are disclosed. In some embodiments, a method comprises presenting real estate listings regarding properties to buyers. Accounts may be created for buyers and real estate agents. Communications from different communication types between one or more buyers and one or more real estate agents regarding any of the real estate listings may be captured. Metadata corresponding to each of the communications may be captured. The communications and the metadata may be stored. A request including identification of a particular real estate agent, a particular buyer, and a particular property may be received. Particular communications may be retrieved in response to the request, the particular communications corresponding to the particular real estate agent, the particular buyer, and the particular property. The particular communications may be provided to the particular real estate agent.

18 Claims, 18 Drawing Sheets

(51) Int. Cl.
  *G06F 16/2457* (2019.01)
  *H04W 12/08* (2021.01)
  *H04W 4/021* (2018.01)
  *H04L 29/06* (2006.01)
  *H04L 29/08* (2006.01)
  *H04L 12/58* (2006.01)
  *H04W 12/00* (2021.01)

(52) U.S. Cl.
  CPC ............ *H04L 51/36* (2013.01); *H04L 63/107* (2013.01); *H04L 67/18* (2013.01); *H04W 4/021* (2013.01); *H04W 4/21* (2018.02); *H04W 12/08* (2013.01); *H04W 12/00503* (2019.01)

(56) References Cited

U.S. PATENT DOCUMENTS

| | | |
|---|---|---|
| 2010/0063829 A1 | 3/2010 | Dupray |
| 2011/0196732 A1* | 8/2011 | Schueller ............... G06Q 20/20 705/14.33 |
| 2014/0006486 A1 | 1/2014 | Bintliff |
| 2014/0148190 A1 | 5/2014 | Lancaster |
| 2014/0289261 A1 | 9/2014 | Shivakumar |
| 2015/0025790 A1 | 1/2015 | Hwang |
| 2015/0031397 A1 | 1/2015 | Jouaux |
| 2015/0121464 A1 | 4/2015 | Hughes |
| 2015/0127728 A1 | 5/2015 | Marti |
| 2016/0055236 A1 | 2/2016 | Frank |
| 2016/0104216 A1 | 4/2016 | Turner |
| 2017/0213178 A1 | 7/2017 | Todd |

OTHER PUBLICATIONS

Henry (Year: 2015).*
International Application No. PCT/US2016/036774, International Search Report and Written Opinion dated Sep. 20, 2016.

* cited by examiner

| Listing ID | Listing Agent ID | Address | Number of Structures | Living Space Size (sq. ft.) | Listing Price ($) | Other info.... |
|---|---|---|---|---|---|---|
| 433432432 | Jennifer A | 123 Main Street, Elmwood, CA 94234 | 1 | 3,200 | 1,200,000 | |
| 3422112 | Scott M | 829 Wood Ct., Atherton, CA 92521 | 4 | 14,534 | 22,200,000 | |
| . . . | . . . | . . . | . . . | . . . | . . . | . . . |

| Agent ID | Password | Agent Name | Preferred Contact Mode | Agent's Office Name | Agent's Phone No. | *** Other info? |
|---|---|---|---|---|---|---|
| Jonathan F | Q%os8xA | Jonathan Frasier | e-mail | Caldwell Banker, San Pablo, CA | 402-123-2222 | |
| Jennifer A | %&C12z | Jennifer Ashcroft | text | It's All Real, Berkeley CA | 210-231-1111 | |
| . . . | | . . . | | . . . | . . . | |

1102 (Jonathan F row)
1104 (Jennifer A row)

*FIG. 11*

| Buyer ID | Password | Buyer Name | Preferred Contact Mode | Buyer's Correspondence Address | Buyer Phone No. | *** Other info? |
|---|---|---|---|---|---|---|
| John D | 1@s8xA | John Doe | e-mail | JD@gmail.com | 555-555-5555 | |
| Jane123 | s12CCz | Jane Smith | text | jane@gmail.com | 555-111-2222 | |
| . . . | | . . . | | . . . | . . . | |

1202 ↗ (John D row)
1204 ↗ (Jane123 row)

*FIG. 12*

| Communication Copy or Pointer | Type of Communication | Timestamp | Buyer ID(s) | Agent ID(s) | Expert ID(s) | Listing ID Number(s) |
|---|---|---|---|---|---|---|
| em(1) | e-mail | 1231315 | John D | | Ralph S | 5165412 |
| em(20) | e-mail | 1223215 | John D | Scott M | | 5165412 |
| text(17) | text | 1223654 | Michael F | Steve Q | | 5880556 |
| tour(15) | interactive video tour | 1354515 | Aaron D, Ben B, Casey G, Kathy A | Cindy H | | 5488468 |
| ... | | | | | | |

1302 → em(1)
1304 → em(20)
1306 → text(17)
1308 → tour(15)

*FIG. 13*

SYSTEMS AND METHODS FOR MULTI-MODE COMMUNICATION MANAGEMENT

CROSS-REFERENCE TO RELATED APPLICATIONS

The present application claims the benefit of U.S. Provisional Patent Application Ser. No. 62/173,347 filed Jun. 9, 2015, and entitled "Computer Platform and Method to Facilitate Selling of Real-Estate," the entirety of which is incorporated herein by reference.

BACKGROUND

Technical Field

Embodiments of the present invention relate generally to the field of data communication. More specifically, embodiments of the present inventions relate to multi-mode communication management.

Description of Related Art

Electronic communications between users can occur through a number of different means, such as e-mail, texting, video chatting, and voice. These different types of communications evolved separately and, due to differing strengths, it is common for users to employ different types of communication. However, while the use of different types of communications may be effective, it is difficult to store and provide efficient access across the different types of communications. For example, some systems may store email data, other systems may store voice data, and so forth, but traditional systems do not efficiently store and provide access to different types of communications.

SUMMARY

Real estate agents typically represent a variety of different properties, and communicate with numerous potential buyers (or, "buyers") before properties are sold. For example, a real estate agent may communicate with buyers using email, phone, and the like, over a period of weeks, months, or even years, before a particular property is sold, which can result in large amounts of communication data (e.g., emails, text messages, chat messages, and the like). Traditionally, real estate agents have only had access to relatively small amounts of such communication data, if they are given any access at all. As a result, real estate agents are often left to rely on their own personal notes, email accounts, and the like, in order to determine the content of previous communications. This can cause, for example, real estate agents to spend extra time preparing real estate transaction documents (e.g., closing documents). Additionally, regulatory requirements may require real estate agents to maintain records of some or all their communications with buyers, which can place a heavy burden on real estate agents relying on their own personal notes and accounts to keep track of their communications.

Some embodiments described herein include systems and methods for managing multi-mode communications to facilitate real estate purchases. For example, a real estate agent may communicate with any number of buyers regarding a particular property over email, text message, and the like, and some or all of those communications may be stored and/or catalogued for efficient access by associated real estate agents. Real estate agents may retrieve previous communications to assist with preparing real estate transaction documents, complying with regulatory requirements, follow-up on potential leads, and so forth. In some embodiments, previous communications may be "packaged" and included in electronic documents, such as real estate closing documents.

It will be appreciated, multi-mode communication may include communications using different communication modes (or "types"). In some embodiments, the different communication types may include text message, email, group chat, one-to-one chat, video chat, interactive video tours, phone, and the like. It will further be appreciated that the different communication types may be implemented using a variety of different communication protocols (e.g., SMS, VoIP, POP3, SMTP, and the like).

In various embodiments, a system comprises a real estate listing module configured to present real estate listings regarding a plurality of properties to a plurality of buyers. A registration module may be configured to create accounts for the plurality of buyers and to create accounts for a plurality of real estate agents. A multi-mode communication capture module may be configured to capture a plurality of communications from different communication types between one or more of the plurality of buyers and one or more of the plurality of real estate agents regarding any of the real estate listings. A metadata communication capture module may be configured to capture metadata corresponding to each of the plurality of communications, the metadata including at least identification of the one or more of the plurality of buyers and the one or more of the plurality of real estate agents involved in each of the communications. A multi-mode communication datastore may be configured to store the plurality of communications and the metadata corresponding to each of the plurality of communications. A filter module may be configured to receive a request, the request including identification of a particular real estate agent from the plurality of real estate agents, identification of a particular buyer of the plurality of buyers, and identification of a particular property of the plurality of properties, and may be configured to retrieve particular communications from the multi-mode communication datastore, the particular communications corresponding to the particular real estate agent, the particular buyer, and the particular property. A multi-mode communication output module may be configured to provide the particular communications to the particular real estate agent.

In some embodiments, the different communication types comprise different communication protocols.

In some embodiments, the different communication types comprise at least two of a text message communication type, email communication type, group chat communication type, video chat communication type, interactive video tour communication type, or a phone communication type.

In some embodiments, the metadata comprises any of metadata embedded within captured communications or generated based on captured communications.

In some embodiments, at least a portion of the plurality of communications comprises anonymous communication between the particular real estate agent and the particular buyer without revealing the identification of the particular buyer to the particular real estate agent.

In some embodiments, wherein the multi-mode communication capture module is further configured to transcribe at least a portion of the particular communications, and the multi-mode communication output module is further configured to provide the transcription to the particular real estate agent.

In some embodiments, the request is generated in response to user input received from the particular real estate agent.

In some embodiments, the request is generated in response to a trigger event without requiring user input. In related embodiments, the trigger event comprises a real estate transaction event.

In various embodiments, a method comprises presenting real estate listings regarding a plurality of properties to a plurality of buyers. Accounts may be created for the plurality of buyers and to create accounts for a plurality of real estate agents. A plurality of communications may be captured from different communication types between one or more of the plurality of buyers and one or more of the plurality of real estate agents regarding any of the real estate listings. Metadata corresponding to each of the plurality of communications may be captured, the metadata may include at least identification of the one or more of the plurality of buyers and the one or more of the plurality of real estate agents involved in each of the communications. The plurality of communications and the metadata corresponding to each of the plurality of communications may be stored. A request may be received, the request may include identification of a particular real estate agent from the plurality of real estate agents, identification of a particular buyer of the plurality of buyers, and identification of a particular property of the plurality of properties. Particular communications may be retrieved from the multi-mode communication datastore in response to the request, the particular communications may correspond to the particular real estate agent, the particular buyer, and the particular property. The particular communications may be provided to the particular real estate agent.

In some embodiments, the different communication types comprise different communication protocols.

In some embodiments, the different communication types comprise at least two of a text message communication type, email communication type, group chat communication type, video chat communication type, interactive video tour communication type, or a phone communication type.

In some embodiments, the metadata comprises any of metadata embedded within captured communications or generated based on captured communications.

In some embodiments, at least a portion of the plurality of communications comprises anonymous communication between the particular real estate agent and the particular buyer without revealing the identification of the particular buyer to the particular real estate agent.

In some embodiments, the method may further comprise transcribing at least a portion of the particular communications, and providing the transcription to the particular real estate agent.

In some embodiments, the request is generated in response to user input received from the real estate agent.

In some embodiments, the request is generated in response to a trigger event without requiring user input. In related embodiments, the trigger event comprises a real estate transaction event.

In various embodiments, a non-transitory computer readable medium comprises executable instructions, the instructions being executable by a processor to perform a method, the method comprising presenting real estate listings regarding a plurality of properties to a plurality of buyers. Accounts may be created for the plurality of buyers and to create accounts for a plurality of real estate agents. A plurality of communications may be captured from different communication types between one or more of the plurality of buyers and one or more of the plurality of real estate agents regarding any of the real estate listings. Metadata corresponding to each of the plurality of communications may be captured, the metadata may include at least identification of the one or more of the plurality of buyers and the one or more of the plurality of real estate agents involved in each of the communications. The plurality of communications and the metadata corresponding to each of the plurality of communications may be stored. A request may be received, the request may include identification of a particular real estate agent from the plurality of real estate agents, identification of a particular buyer of the plurality of buyers, and identification of a particular property of the plurality of properties. Particular communications may be retrieved from the multi-mode communication datastore in response to the request, the particular communications may correspond to the particular real estate agent, the particular buyer, and the particular property. The particular communications may be provided to the particular real estate agent.

BRIEF DESCRIPTION OF THE DRAWINGS

FIG. 10 depicts an example real estate listing record according to some embodiments.

FIG. 11 depicts an example agent records according to some embodiments.

FIG. 12 depicts example buyer records according to some embodiments.

FIG. 13 depicts example communication records according to some embodiments.

DETAILED DESCRIPTION

Real estate agents typically represent a variety of different properties, and communicate with numerous potential buyers (or, "buyers") before properties are sold. For example, a real estate agent may communicate with buyers using email, phone, and the like, over a period of weeks, months, or even years, before a particular property is sold, which can result in large amounts of communication data (e.g., emails, text messages, chat messages, and the like). Traditionally, real estate agents have only had access to relatively small amounts of such communication data, if they are given any access at all. As a result, real estate agents are often left to rely on their own personal notes, email accounts, and the like, in order to determine the content of previous communications. This can cause, for example, real estate agents to spend extra time preparing real estate transaction documents (e.g., closing documents). Additionally, regulatory requirements may require real estate agents to maintain records of some or all their communications with buyers, which can place a heavy burden on real estate agents relying on their own personal notes and accounts to keep track of their communications.

Some embodiments described herein include systems and methods for managing multi-mode communications to facilitate real estate purchases. For example, a real estate agent may communicate with any number of buyers regarding a particular property over email, text message, and the like, and some or all of those communications may be stored and/or catalogued for efficient access by associated real estate agents. Real estate agents may retrieve previous communications to assist with preparing real estate transaction documents, complying with regulatory requirements, follow-up on potential leads, and so forth. In some embodiments, previous communications may be "packaged" and included in electronic documents, such as real estate closing documents.

It will be appreciated that multi-mode communication may include communications using different communication modes (or "types"). In some embodiments, the different communication types may include text message, email, group chat, one-to-one chat, video chat, interactive video tours, phone, and the like. It will further be appreciated that the different communication types may be implemented using a variety of different communication protocols (e.g., SMS, VoIP, POP3, SMTP, and the like).

Figure 1:
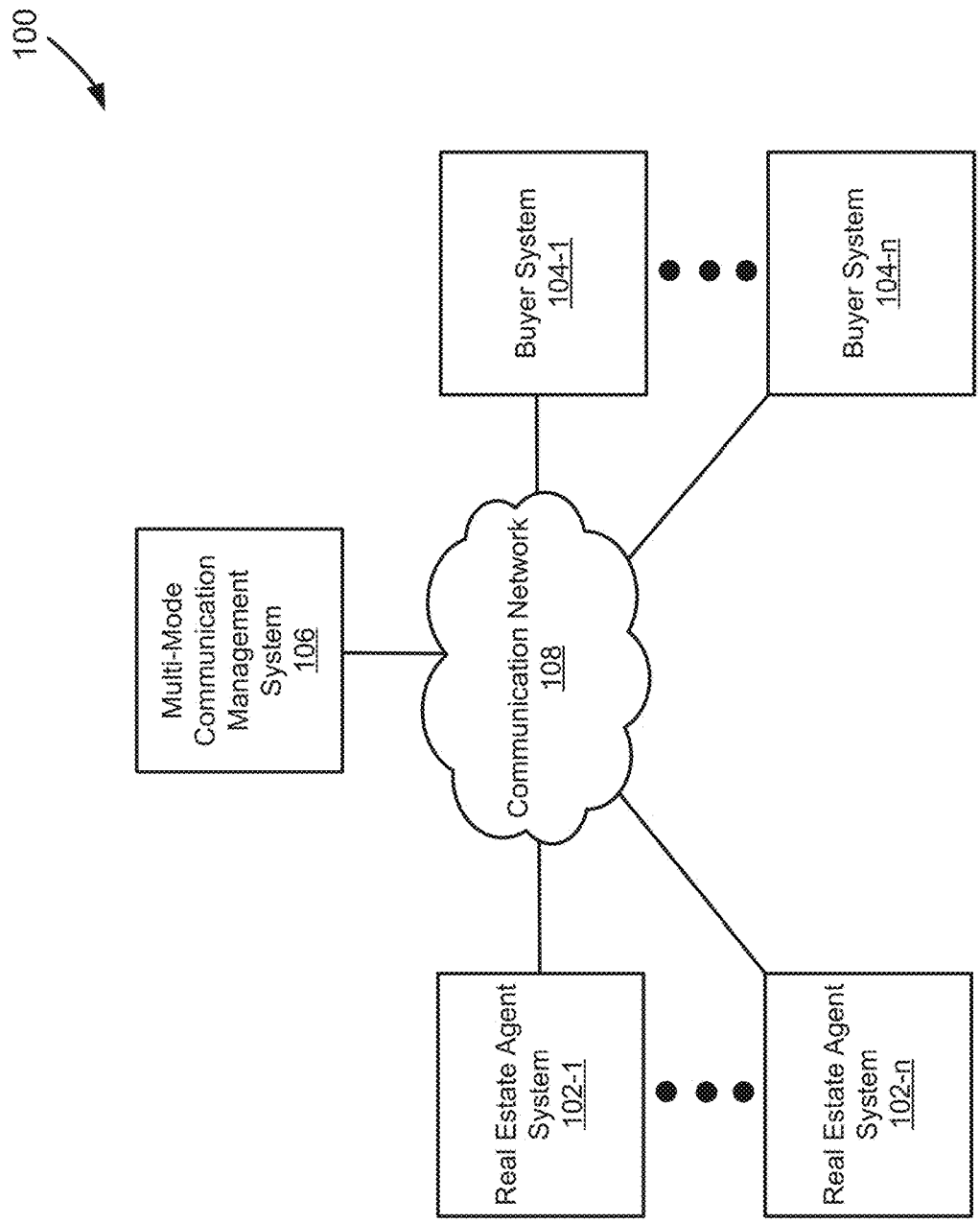
FIG. 1 depicts a block diagram of an example system capable of facilitating real estate purchases and managing multi-mode communications according to some embodiments.

FIG. 1 depicts a block diagram of an example system 100 capable of facilitating real estate purchases and managing multi-mode communications according to some embodiments. The system 100 includes real estate agent systems 102-1 to 102-n (individually, the real estate agent system 102, collectively, the real estate agent systems 102), buyer systems 104-1 to 104-n (individually, the buyer system 104, collectively, the buyer systems 104), a multi-mode communication management system 106, and a communication network 108.

The real estate agent systems 102 may be configured to facilitate multi-mode communication between real estate agents and other associated systems and users (e.g., buyers).

It will be appreciated that real estate agents (or, "agents") may comprise real estate agents, and other related experts or professionals, such as, real estate or building experts, mortgage brokers, insurance agents, financial planners, software or service consultants who may interact with clients online, and who may, like the agents, need to extract all of their communication to document their interaction for legal reasons. In some embodiments, the functionality of the real estate agent systems 102 may be performed by one or more mobile devices (e.g., smartphones, cell phones, smartwatches, tablet computers, or the like), desktop computers, laptop computers, and the like.

In some embodiments, agents may interact with the real estate agent system 102 (e.g., via a web browser or mobile application executing on the system 102) to communicate with buyers over different communication types regarding one or more properties. For example, agents may be able to receive and respond to communications from different buyers, provide virtual tours of properties, and the like.

In some embodiments, the real estate agents systems 102 may be configured to receive requests from agents for communication data. For example, a particular agent may request communication data for their communications with a particular buyer and/or a particular property. In some embodiments, communication data may be requested for communications occurring during a particular period of time (e.g., all time, a week, a month, and so forth). For example, an agent may request all of their communications with a buyer Frank Jones. This may help, for example, with the preparation of closing documents and/or complying with regulatory requirements.

The buyer systems 104 may be configured to display, or otherwise present, real estate listings to buyers. It will be appreciated that buyers may include potential buyers, as well as buyers that have completed a purchase. In some embodiments, the functionality of the buyer systems 104 may be performed by one or more mobile devices (e.g., smartphones, cell phones, smartwatches, tablet computers, or the like), desktop computers, laptop computers, and the like.

In some embodiments, the buyer systems 104 may be configured to facilitate multi-mode communication between buyers and other associated systems and users (e.g., real estate agents). For example, a buyer may be able to interact with the buyer system 104 (e.g., via a web browser or mobile application executing on the system 104) and to communicate with real estate agents associated with a property to obtain information on the property and exchange documents related to the purchase of the property.

The multi-mode communication management system 106 may be configured to facilitate real estate purchases and manage multi-mode communications. In some embodiments, the system 106 may store and retrieve multi-mode communications between any number of real estate agents and any number of buyers. This can help, for example, real estate agents communicate with buyers, prepare documents (e.g., closing documents), comply with regulatory requirements, follow up on leads, and the like. In some embodiments, the functionality of the multi-mode communication management system 106 may be performed by one or more servers, workstations, desktop computer, mobile devices (e.g., smartphones, cell phones, smart watches, tablet computers, or the like), laptop computers, and the like.

In some embodiments, the multi-mode communication management system 106 comprises a communications platform allowing agents and buyers to communicate with each other. For example, the system 106 may include a web server, mobile application server, chat server, VoIP server, and the like. Forms of communications supported by the multi-mode communication management system 106 may include e-mails between buyer and agents, text messages between buyers and agents, interactive video tours of properties hosted by an agent for one or more buyers, and/or a group chat with an agent and buyers. Each of these forms of communication and may be initiated and accessed over network 108.

In some embodiments, buyers and/or agents may communicate anonymously through the multi-mode communication management system 106. For example, buyers may be able to communicate with agents without revealing their identity and/or other related information. This may help, for example, to increase a likelihood that buyers communicate with real estate agents. Similarly, in some embodiments, agents may be able to communicate with buyers without revealing their identity and/or other related information, although typically at least some agent information will be revealed to the buyer.

Thus, for example, if buyer John D sends agent Jonathan F an e-mail or text message, or joins in a video tour, agent Jonathan F may only see a Buyer ID (e.g., customer #12345 or "John D"). On the other hand, when agent Jonathan F sends buyer John D an e-mail, for example, agent Jonathan F's full name may be displayed, or buyer John D is presented with an option to obtain that data, such as by clicking on a hyperlinked agent name (e.g., "Jonathan F") which then allows buyer John D to see at least some of agent Jonathan F's agent information.

In some embodiments, the multi-mode communication management system 106 may provide the buyer with an option to make their information available to an agent. Thus, for example, the multi-mode communication management system 106 may present an option on the screen of a device associated with the buyer system 104 prompting the buyer to indicate whether an agent may view at least some of their buyer information. If the buyer indicated the agent is allowed to see at least some of their information, than that agent may have access to that information.

It will be appreciated that communication information or data, as discussed herein, may include information on some or all of the communications between buyers and agents. The communications may include, for example, questions from an agent to another agent, questions sent directly to an agent by a buyer; interactive video tours hosted by an agent for one or more buyers, a group chat between an agent and one or more interested buyer; message threads between agents and buyers, text and SMS messages between a buyer and an agent, and/or e-mail correspondence between and agent and buyer. Thus, for example, communication data may include timestamps, and for e-mail: the sender and recipient, the type of email (answer to a question, etc.) message body, attachments; for video streaming, a copy of the video, the author, location, and any live viewers (and any later viewers); for a chat, all participants and all messages; and for forum-like communication: questions, answers, participants.

In some embodiments, buyers and agents may communicate directly with each other and/or through third-party systems, and the multi-mode communication management system 106 may manage such communications. For example, buyer systems 104 may communicate with real estate agent systems 102 through a third-party email server, VoIP server, or the like, and the system 106 may be provided with an "echo" copy of the communication data. This may allow, for example, the system 106 to be deployed without requiring users to switch to different servers, email addresses, phone numbers, or the like.

In some embodiments, the multi-mode communication management system 106 may be configured to provide real estate listings for presentation by one or more other systems (e.g., real estate agent systems 102 and buyer systems 104). For example, the multi-mode communication management system 106 may maintain a database of properties and provide real estate listings based on that database, and/or provide real-estate listings based on property databases maintained by one or more third-parties (e.g., MLS services).

In some embodiments, the communication network 108 represents one or more computer networks (e.g., LAN, WAN, or the like). The communication network 108 may provide communication between any of the real estate agent systems 102, the buyer systems 104, and the multi-mode communication management system 106. In some implementations, the communication network 108 comprises computing devices, routers, cables, buses, and/or other network topologies. In some embodiments, the communications network 108 may be wired and/or wireless. In various embodiments, the communications network 108 may comprise the Internet, one or more networks that may be public, private, IP-based, non-IP based, and so forth.

Figure 2:
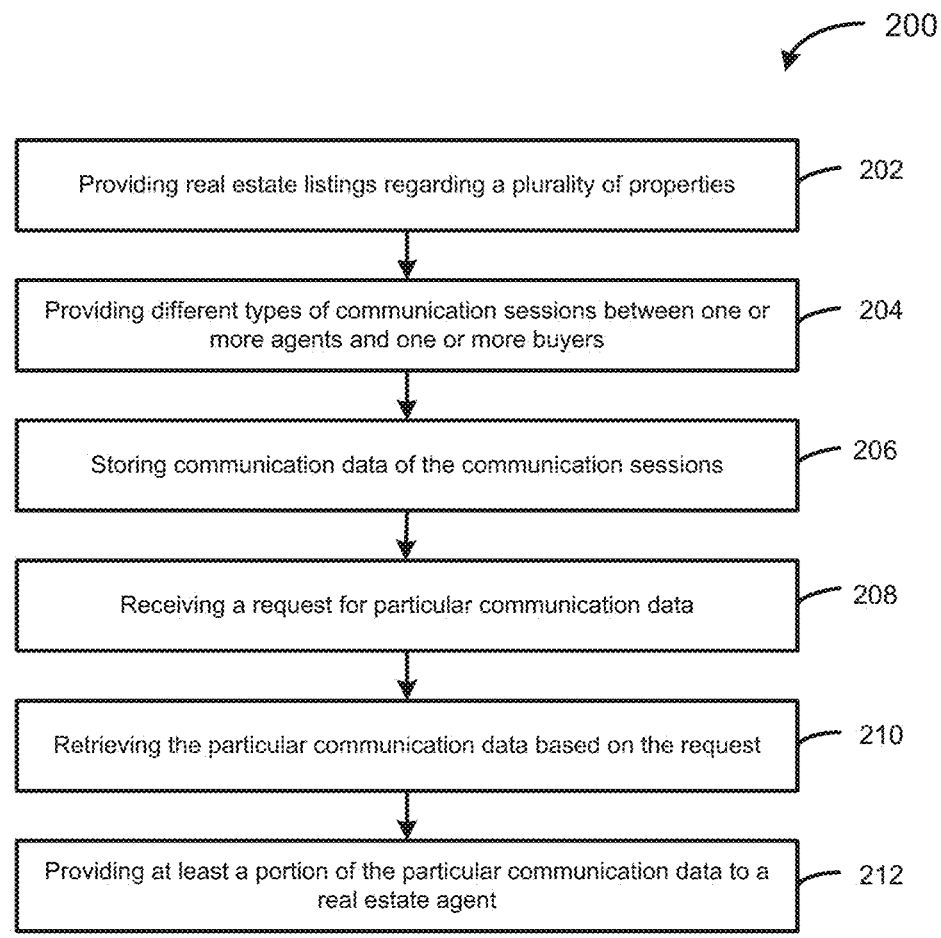
FIG. 2 depicts a flowchart of an example method of operation of a system capable of facilitating real estate purchases and managing multi-mode communications according to some embodiments.

FIG. 2 depicts a flowchart 200 of an example method of operation of a system capable of facilitating real estate purchases and managing multi-mode communications according to some embodiments. In this and other flowcharts, the flowchart illustrates by way of example a sequence of steps. It should be understood the steps may be reorganized for parallel execution, or reordered, as applicable. Moreover, some steps that could have been included may have been removed to avoid providing too much information for the sake of clarity and some steps that were included could be removed, but may have been included for the sake of illustrative clarity.

Figure 7:
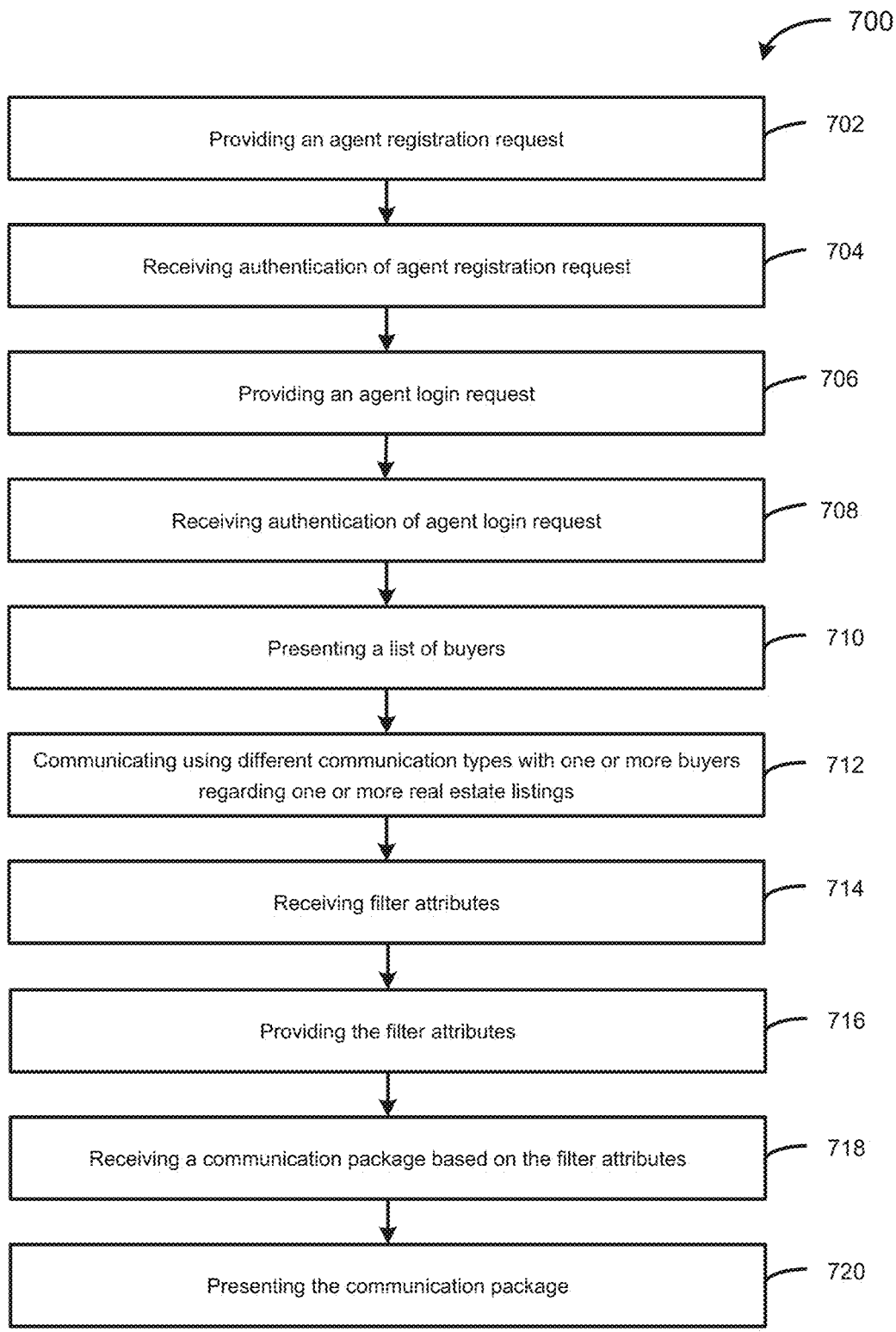
FIG. 7 depicts a flowchart of an example method of operation of a real estate agent system according to some embodiments.

In step 202, a multi-mode communication management system 106 provides real estate listings regarding a plurality of properties for presentation by one or more buyer systems 104. For example, a web server or application server executed by the multi-mode communication management system 106 may provide the real estate listings. In some embodiments, the real estate listings may be maintained by the multi-mode communication management system 106 and/or by a third-party system (e.g., an MLS system). Real estate listings may include, for example, a listing number, listing agent ID, address, property description, listing price, and the like. Example real estate listings are shown in FIG. 7.

In step 204, the multi-mode communication management system 106 provides different types of communication sessions between one or more of the real estate agent systems 102 and one or more buyer systems 104 regarding any of the properties. For example, a real estate agent system 102 may login to the multi-mode communication management system 106 to text chat with a first buyer, email a second buyer, video chat with a group of third buyers, and so forth. It will be appreciated that some or all of the communications may be anonymous. More specifically, the real estate agent may not receive any identifying information regarding some or all of the buyers, and/or or receive limited buyer information (e.g., a screenname). In some embodiments, the multi-mode communication management system 106 may host the different types of communications sessions, although in other embodiments, one or more of the different types of communication sessions may be hosted by a third-party system (e.g., a Skype system), and the multi-mode communication management system 106 may be provided with an echo copy of the session(s).

In one example, a real estate agent may initiate an interactive video tour communication session with a group of different buyers. The video tour may include video and/or audio relating to one or more properties, and the real estate agent and the buyers may be able to communicate with each other via text and/or voice chat. In some embodiments, real estate agents and/or buyers may be able to see each other during a communication session via a video feed (e.g., captured by a web cam). Buyers may be able to ask questions during the communication session, and the real estate agent may be able to respond directly to individual buyers, and/or to the group of buyers. In some embodiments, particular communications within a group communication session may be anonymous, while other communications may not be anonymous. For example, one buyer may choose to only reveal a screenname, while another buyer may choose to reveal their name, address, and/or other attribute information.

In some embodiments, anonymous communications may still be managed and/or stored by the multi-mode communication management system 106. For example, the communications may be associated with a particular buyer even though the communication is currently flagged as anonymous. This may allow the real estate agent to access the communication at a later time (e.g., if the buyer provides permission or otherwise indicates the communication should no longer be flagged as anonymous).

In step 206, the multi-mode communication management system 106 stores communication data of the communication sessions. For example, the communication data may be stored in real-time (e.g., while the communication sessions are in progress), and/or after the sessions have been completed. As noted above, the multi-mode communication management system 106 may store echo copies for communication sessions hosted by other systems.

In step 208, the multi-mode communication management system 106 receives a request for particular communication data between a particular real estate agent a particular buyer. For example, a real estate agent may login to a real estate system 102, and input a request that is then provided to the multi-mode communication management system 106. The request may identify the real estate agent, the particular buyer, the particular property, and/or a time period (e.g., all time, a particular month, week, day, and the like).

In step 210, the multi-mode communication management system 106 retrieves the particular communications based on the request. In some embodiments, the multi-mode communication management system 106 may retrieve all corresponding communications, including anonymous communications, and provide a request to the corresponding buyer to release some or all of the anonymous communications.

In step 212, the multi-mode communication management system 106 provides at least a portion of the retrieved documents to the particular real estate agent. For example, the multi-mode communication management system 106 may provide the non-anonymous communications and any previously anonymous communications the buyer has given permission to release.

Figure 3:
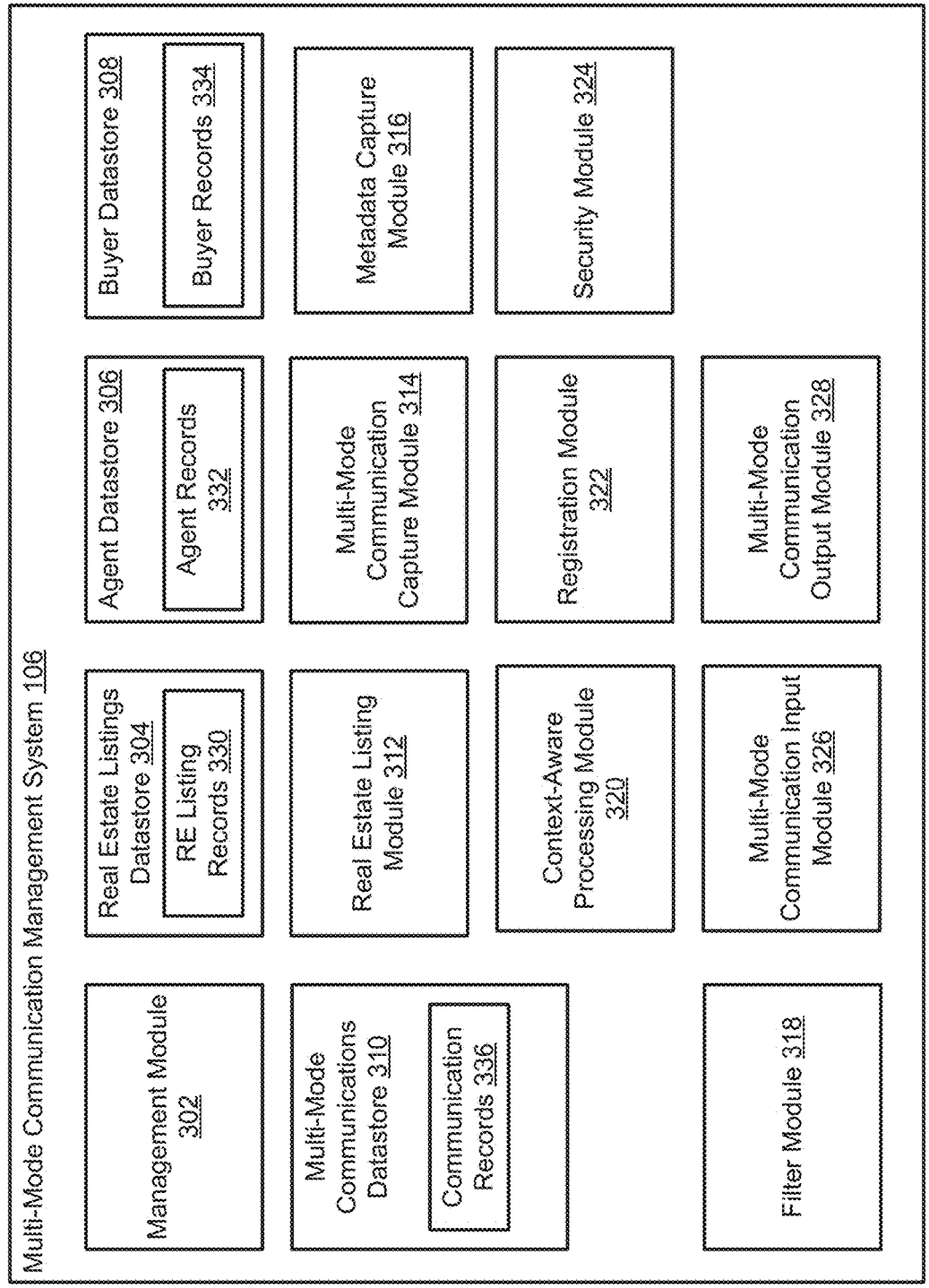
FIG. 3 depicts a block diagram of an example multi-mode communication management system according to some embodiments.

FIG. 3 depicts a block diagram 300 of an example multi-mode communication management system 106 according to some embodiments. In some embodiments, the multi-mode communication management system 106 includes management module 302, a real estate listings datastore 304, an agent datastore 306, a buyer datastore 308, a multi-mode communications datastore 310, a real estate listing module 312, a multi-mode communication capture module 314, a metadata capture module 316, a context-aware processing module 320, a registration module 322, a security module 324, a multi-mode communication input module 326, and a multi-mode communication output module 328.

The management module 302 may be configured to manage (e.g., create, read, update, delete, or otherwise access) real estate listing records 330 stored in the real estate listings datastore 304, agent records 332 stored in the agent datastore 306, buyer records 334 stored in the buyer datastore 308, and communication records 336 stored in the multi-mode communications datastore 310. The management module 302 may perform any of these operations manually (e.g., by an administrator interacting with a GUI), automatically (e.g., by one or more of the modules 312-328), or both. In some embodiments, the management module 302 comprises a library of executable instructions which are executable by a processor for performing any of the aforementioned management operations. The datastores 304-308 may be any structure and/or structures suitable for storing the records 330-336 (e.g., an active database, a relational database, a self-referential database, a table, a matrix, an array, a flat file, a documented-oriented storage system, a non-relational No-SQL system, an FTS-management system such as Lucene/Solar, and the like). In some embodiments, the functionality of the management module 302 may be included in one or more other modules of the multi-mode communication management system 106.

In some embodiments, the real estate listing records 330 records may each include a variety of attributes and values associated with a real estate listing. For example, the real estate listing records 330 may store some or all of the following data:

Listing Identifier: identifies the stored real estate listing and associated property.

Listing Agent(s): one or more listing agents associated with the stored real estate listing.

Address: address of the property.

Structures: number and/or description of structures of the property.

Living Space Size: a living space size, e.g., square footage of the property.

Listing Price(s): current and/or historical listing price(s) of the property.

Other Information: other information associated with the property, such as notes provided by the listing agents, e.g., condition of the property, residential and geographic information (e.g., school district information).

Timestamp(s): time/date information for associated CRUD operations performed on the stored real estate listing record.

Example real estate listing records are shown in FIG. 10. The real estate listing records 330 may store any additional information regarding the property including ownership history of the property, past damages, modifications, financial information related to the property, tax status, and the like.

In some embodiments, the agent records 332 may each include a variety of attributes and values associated with a real estate agent. For example, the agent records 332 may store some or all of the following data:

Agent Identifier: identifies the stored agent record.

Agent Account Information: account information, e.g., username, password, and the like. Some embodiments may have a greater or lesser amount of account information, and/or it may be anonymized, encrypted, and so forth.

Agent Name

Preferred Contact Mode: contact mode preferred by the agent (e.g., email).

Agent's Office Name

Agent's Contact Information: contact information (e.g., email address, phone number, Skype username, mailing address, and the like) for the agent.

Associated Properties: properties represented by the agent.

Associated Buyers: buyers with which the agent has communicated.

Other Attributes: demographic and/or psychographic attributes associated with the agent, e.g., age, gender, location, etc.

Timestamp(s): time/date information for associated CRUD operations performed on the stored agent record.

Example agent records are shown in FIG. 11. The agent records 332 may store any additional information regarding the agent including, for example, number of times the agent has represented sellers or buyers, if the agent sells property above or below asking prices, prices of properties sold by the agent in the past, and the like.

In some embodiments, the buyer records 334 may each include a variety of attributes and values associated with a buyer. In some embodiments, buyer records 334 may be generated prior to buyer account registration. For example, buyer records 334 may be generated in response to an initial communication with a real estate agent. In some embodiments, the buyer records 334 may store some or all of the following data:

Buyer Identifier: identifies the stored buyer record.

Buyer Account Information: account information, e.g., username, password, and the like. Some embodiments may have a greater or lesser amount of account information, and/or it may be anonymized, encrypted, and so forth.

Buyer Name

Preferred Contact Mode: contact mode preferred by the buyer (e.g., email).

Buyer's Contact Information: contact information (e.g., email address, phone number, Skype username, mailing address, and the like) for the buyer.

Associated Properties: properties viewed and/or sent requests regarding.

Associated Agents: agents with which the buyer has communicated.

Other Attributes: demographic and/or psychographic attributes associated with the buyer, e.g., age, gender, location, etc.

Timestamp(s): time/date information for associated CRUD operations performed on the stored buyer record.

Example buyer records are shown in FIG. 12. The buyer records 334 may store any additional information regarding the buyer.

In some embodiments, the communication records 336 may each include a variety of attributes and values associated with different types of communications between one or more buyers and one or more real estate agents. For example, the communication records 336 may store some or all of the following data:

Communication Identifier: identifies the stored communication.

Communication Type: type of communication, e.g., text message, email, group chat, one-to-one chat, video chat, interactive video tours, phone, and the like. In some embodiments, communications may be associated with one or more communication types.

Buyer(s): one or more buyers associated with the stored communication.

Agent(s): one or more agents associated with the stored communication.

Listing(s): one or more real estate listings and/or properties associated with the stored communication.

Anonymous: indicates whether the stored communication is at least partially anonymous. This may be a flag (e.g., on/off), and/or having varying degrees. For example, particular buyer information (e.g., account name) may be accessible by an associated real estate agent, while other attributes (e.g., name) may be inaccessible.

Timestamp(s): time/date information for associated CRUD operations performed on the stored communication record.

Metadata: metadata associated with the stored communication. For example, metadata may indicate an agent, buyer, and property associated with the stored communication.

Example communication records are shown in FIG. 13. The communication records 336 may store any additional information regarding the communications.

The real estate listing module 312 may be configured to present real estate listings. For example, real estate listings may be presented through a web browser, web application, or other interface of real estate agent systems and/or buyer systems. In some embodiments, buyers may select a particular real estate listing to imitate communication with a real estate agent representing the particular property. Real estate listings may be generated from property information stored by the multi-mode communication system 106 and/or other systems (e.g., MLS systems).

The multi-mode communication capture module 314 may be configured to capture different types of communications between any number of real estate agents and any number of buyers. Captured communications may be stored in the multi-mode communications datastore 310. In some embodiments, communications may be captured in real-time (e.g., as they are occurring), or in delayed-time. For example, communication data may be captured from batches of emails, text messages, and the like. In some embodiments, the captured communications may comprise copies or recordings of the communication between agents and buyers. For example, the captured communications may comprise video files, audio files, text files, and the like.

In some embodiments, the multi-mode communication capture module 314 may be configured to transcribe some or all communication data. For example, text, voice and/or video communications may be transcribed and stored. The transcribed communications may be searched and filtered as described herein. For example, when a real estate agent requests a particular communication, the system 106 may retrieve the transcribed communication instead of, or in addition to, a copy or recording of the actual communication (e.g., audio file, video file, email message, text message, and so forth). Similarly, the transcribed communications may be included in a package or folio instead of, or in addition to, the actual communications.

The metadata capture module 316 may be configured to capture metadata associated with multi-mode communications. For example, the metadata may include attribute information of a real estate agent associated with the communication, attribute information of one or more buyers associated with the communication, and attribute information of the property or real estate listing associated with the communication. In some embodiments, the metadata may be included within the communications, and/or generated based on the communications. Metadata may include, in some embodiments, time and date of communication, type of communication (e.g., videoconference, VOIP telephone call, text, chat, instant message, or the like), duration of communication, or any other information. In various embodiments, metadata may be captured from both anonymous communications and non-anonymous communications. For example, a buyer's information may be captured for an anonymous communication, but may not be revealed to the real estate agent until the buyer consents to release the information and/or upon a trigger event (e.g., a closing event).

The filter module 318 may be configured to receive requests, and retrieve communications based on the request. For example, the filter module 318 may receive requests for communications associated with a particular buyer, a particular real estate agent, a particular property, and/or a particular period of time. Retrieved multi-mode communications may be stored in a cache, buffer, datastore, other logical storage, or any combination. In some embodiments, retrieved multi-mode communications may be stored as communication packages (or, "packages"). As used herein, packages may comprise communication folios (or, "folios").

The filter module 318 may be configured to package particular communications (e.g., for presentation to a real estate agent and/or inclusion within electronic documents). For example, the system may retrieve particular communications and generate a package or folio that may include the particular communications, and/or a summary of the particular communications, between a buyer and the agent with respect to a specific property. Thus, for example, it may be required that the closing papers of a real estate sale include some or all communications between the agent and the buyer. Thus, in some embodiments, the filter module 318 may be configured to: 1) store copies of the electronic communications in communications information; 2) allow an agent to request copies of all communications regarding a specific listed property that occurred between the agent and the buyer; and 3) deliver requested copies of communications to the agent in a communications folio. In various embodiments, the communications folio is: 1) contained in one digital file; 2) are encrypted and password protected; and/or 3) are downloadable by the agent via SSL.

In some embodiments, packages may contain a manifest file that lists all of the materials (the type of communication, the date/timestamp, the parties involved), and where in the archive the information is located. This manifest file can be, but is not limited to, a spreadsheet or a text document (e.g., text, PDF, Word) having links to communication information which the agent may click on to bring up a copy of the communication, which the agent may then print.

In addition to agents being able to obtain packages, particular types of agents, especially professionals such as mortgage brokers, insurance agents, financial planners, software or service consultants who may interact with clients online, and who may need to extract all of their communication to document their interaction for legal reasons, are allowed to generate packages of communications between themselves and buyers.

In addition, the ability to obtain communications folios is generally useful for systems that allow for even one form of communication, and that the ability to do so may not be limited to the structure of systems described herein. For example, an e-mail program, such as Gmail or Outlook may be modified to include the folio features described herein, and for example, a user could be provided with the ability to request a copy of all e-mails, with or without attachments from a specific sender, over a specific time frame, or including keywords in the subject line, and thus easily obtain copies of emails meeting certain requirements. Thus, for example, a user may filter their e-mail based on certain criteria, and choose to obtain a communications folio of all of the resulting communications, which may be presented to the agent and/or included in related documents.

The context-aware processing module 320 may be configured to determine context information associated with particular communications. In some embodiments, context information may include links to related properties, real estate agents, buyers, and the like. For example, a real estate agent may request particular communications associated with a particular buyer and a particular property. The context-aware processing module 320 may determine buyers with similar attribute information, and provide the real estate agent with links to those buyers. In some embodiments, context information may be determined based on metadata and/or attribute information associated with particular communications.

In some embodiments, the context-aware processing module 320 may be configured to provide a list of real estate agents to buyers. A list of real estate agents may be provided based on buyer attribute information, agent attribute information, communication information, and the like. For example, a buyer may search for real estate listings within a particular geographic area, and the context-aware processing module 320 may determine which real estate agents are associated with that geographic area. In some embodiments, the list may be ranked. For example, real estate agents with a stronger connection to a geographic area (e.g., based on representing more properties in the geographic area and/or being physically located closer to the geographic area) may be ranked higher than other real estate agents with a weaker connection to the geographic area.

In some embodiments, the context-aware processing module 320 may be configured to trigger one or more actions based on one or more trigger events and/or trigger conditions. For example, trigger actions may include generating requests, retrieving particular communications, generating packages or folios, identifying buyer information associated with anonymous communications and/or otherwise converting anonymous communications to non-anonymous communications, storing communications, determining and providing context information, embedding particular communications within electronic documents (e.g., closing documents), and the like. Trigger events may include initiating a communication session, terminating a communication session, occurrence of a particular real estate transaction (e.g., a closing transaction), and the like. Thus, for example, the module 320 may trigger a request for a buyer to release some or all buyer attribute information for anonymous communications with an associated real estate agent upon beginning a closing transaction. Similarly, upon receiving approval from the buyer to release the buyer attribute information, the module 320 may trigger release of the information to the real estate agent and/or insert the associated communications in related documents (e.g., closing documents).

The registration module 322 may be configured to create accounts for real estate agents and buyers, and/or update account information for real estate agents and buyers. For example, the accounts may include attribute information (e.g., account credentials, demographic information, psychographic information, and the like). In some embodiments, registration may be required in order to access various features and/or manage communications. For example, registration may be required for a buyer to participate in particular types of communications, or for the multi-mode communication system 106 to capture, or otherwise manage, communications.

In some embodiments, registration may not be required for some features (e.g., the multi-mode communication system 106 may capture, or otherwise manage, communications). For example, prior to registration, a buyer may initially communicate anonymously with a registered agent. Subsequently, the buyer may register for an account, and continue to communicate anonymously with the registered agent, or choose to reveal some or all of their attribute information. Although the initial communication may have been made anonymously by an unregistered buyer, the registered agent, in some embodiments, may nonetheless be able to retrieve some or all of the communications with the buyer, including the initial communications. In some embodiments, the system 106 may require approval from a buyer prior to providing the registered agent with anonymous communications and/or communications made prior to buyer registration.

The security module 324 may be configured to authenticate access to the multi-mode communication management system 106. For example, the security module 324 may compare permissions (e.g., account credentials) of a real estate agent system 102 or buyer system against stored permissions prior to allowing the systems 102 and 104 to transmit and/or receive communications through the system 106. In a specific embodiment, the security module 324 may also be configured to secure communications between systems. In some embodiments, the security module 324 provides encryption and decryption functionality, e.g., provided by an operating system (e.g., Windows, Linux, Mac OS), or otherwise (e.g., a custom solution). For example, the security module 324 may encrypt data messages transmitted from the multi-mode communication management system 106 and decrypt data messages received at the multi-mode communication management system 106.

The multi-mode communication input module 326 may be configured to receive requests and data from one or a plurality of systems over communication connections associated with different communication types. The multi-mode communication input module 326 may receive data from a system through a network or a portion of a network. Depending upon implementation-specific or other considerations, the multi-mode communication input module 326 may receive data through a connection, all or a portion of which may be a wireless connection. The multi-mode communication input module 326 may receive messages, and/or other communications from associated systems. In some embodiments, the multi-mode communication input module 326 may be configured to stream data.

The multi-mode communication output module 328 may be configured to send requests to one or a plurality of systems. The multi-mode communication output module 328 may send requests to a system through a network or a portion of a network. Depending upon implementation-specific or other considerations, the multi-mode communication output module 328 may send requests through a connection, all or a portion of which may be a wireless connection. The multi-mode communication output module 328 may request messages, and/or other communications from associated systems. In some embodiments, the multi-mode communication output module 328 may be configured to stream data to one or more other remote systems.

It will be appreciated that in some embodiments, the functionality of the multi-mode communication input module 326 and the multi-mode communication output module 328 may be combined in a single module (e.g., a multi-mode communication module). Similarly, other modules and/or datastores described herein may be combined, or otherwise configured, to perform some or all of the functionality of one or more other modules.

Figure 4:
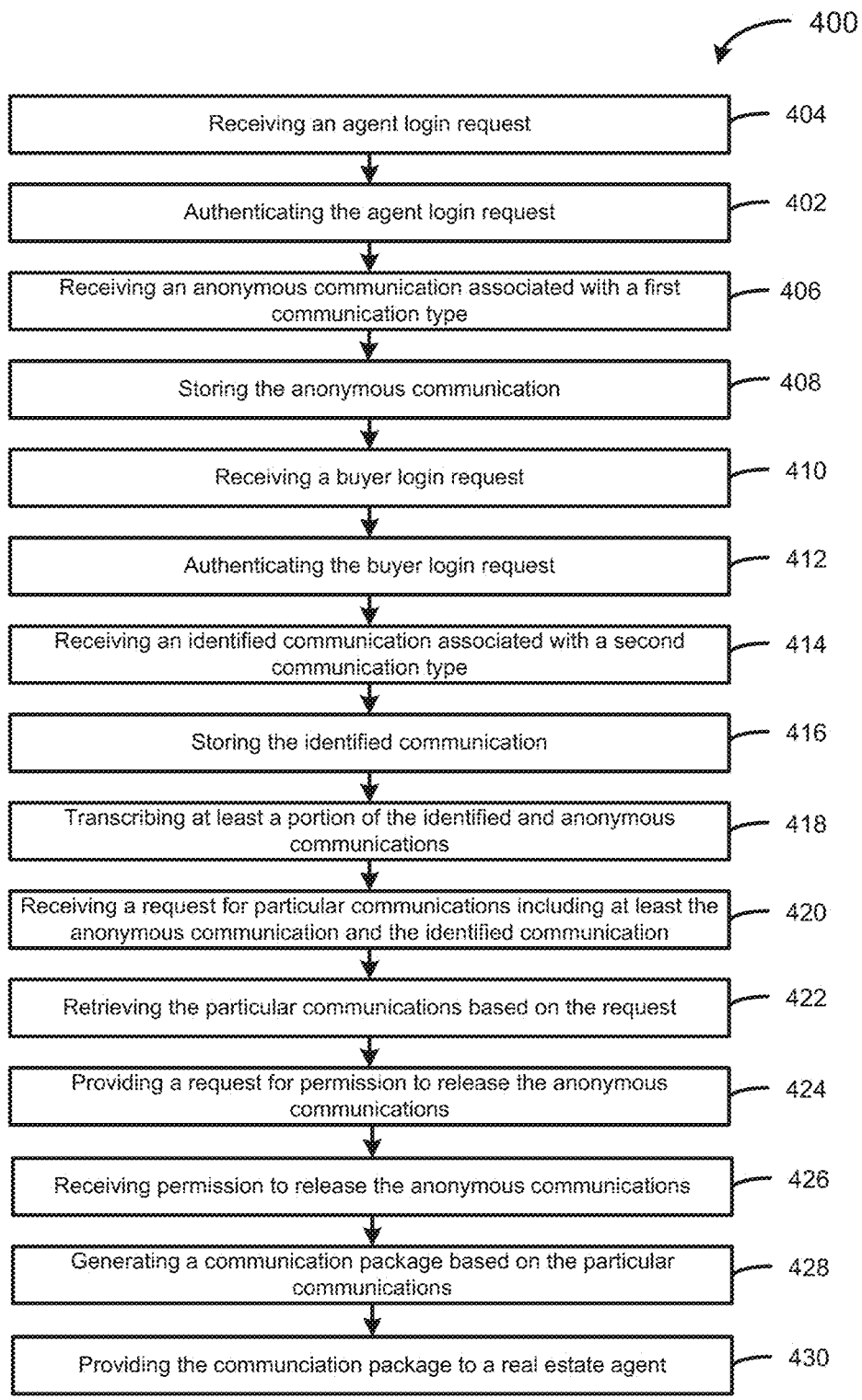
FIG. 4 depicts a flowchart of an example method of operation of a multi-mode communication management system according to some embodiments.

FIG. 4 depicts a flowchart 400 of an example method of operation of a multi-mode communication management system according to some embodiments.

In step 402, a multi-mode communication management system 106 receives an agent login request. For example, the agent login request may be received from a real estate agent system 102 and may include agent account credentials. In some embodiments, a security module 324 receives the agent login request.

In step 404, the multi-mode communication management system 106 authenticates the agent login request. For example, the multi-mode communication management system 106 may compare agent account credentials included within the request with corresponding agent account credentials stored in an agent datastore 306. In some embodiments, the security module 324 authenticates the agent login request.

In step 406, the multi-mode communication management system 106 receives an anonymous communication associated with a first communication type. In some embodiments, a multi-mode communication input module 326 receives the anonymous communication. In step 408, the multi-mode communication management system 106 stores the anonymous communication. In some embodiments, a management module 302 stores the anonymous communication in a multi-mode communications datastore 310.

In step 410, the multi-mode communication management system 106 receives a buyer login request. In some embodiments, the security module 324 receives the buyer login request. In step 412, the multi-mode communication management system 106 authenticates the buyer login request. In some embodiments, the security module 324 authenticates the buyer login request.

In step 414, the multi-mode communication management system 106 receives an identified communication associated with a second communication type. In some embodiments, a multi-mode communication input module 326 receives the identified communication. In step 416, the multi-mode communication management system 106 stores the identified communication. In some embodiments, the management module 302 stores the identified communication in the multi-mode communications datastore 310.

In step 418, the multi-mode communication management system 106 transcribes at least a portion of the identified and anonymous communications. In some embodiments, anonymous communications may be transcribed after the associated buyer has provided permission to release the anonymous communications. In some embodiments, a context-aware processing module 320 performs the transcription, and the management module 302 stores the transcription in the multi-mode communications datastore 310.

In step 420, the multi-mode communication management system 106 receives a request for particular communications. In some embodiments, a filter module 318 receives the request. In step 422, the multi-mode communication management system 106 retrieves the particular communications, the particular communications including at least the anonymous communication and the identified communication. In some embodiments, the filter module 318 retrieves the particular communications.

In step 424, the multi-mode communication management system 106 provides a request for permission to release anonymous communications. In some embodiments, the security module 324 provides the request. In step 426, the multi-mode communication management system 106 receives permission to release the anonymous communications. In some embodiments, the security module 324 receives the permission to release the anonymous communications. In step 428, the multi-mode communication management system 106 releases the anonymous communications. For example, the security module 328 may instruct the management module 302 to change an attribute value of a corresponding communication record 336 of the multi-mode communications datastore to indicate the communication is no longer anonymous.

In step 428, the multi-mode communication management system 106 the multi-mode communication management system 106 generates communication package based on the particular communications. For example, the communication package may include the transcriptions of the particular communications. In some embodiments, the filter module 318 generates the communication package.

In step 430, the multi-mode communication management system 106 provides the communication package. For example, the communication package may be provided for presentation by the real estate system 102, and/or inclusion in an electronic document (e.g., a closing document). In some embodiments, a multi-mode communication output module provides the communication package.

Figure 5:
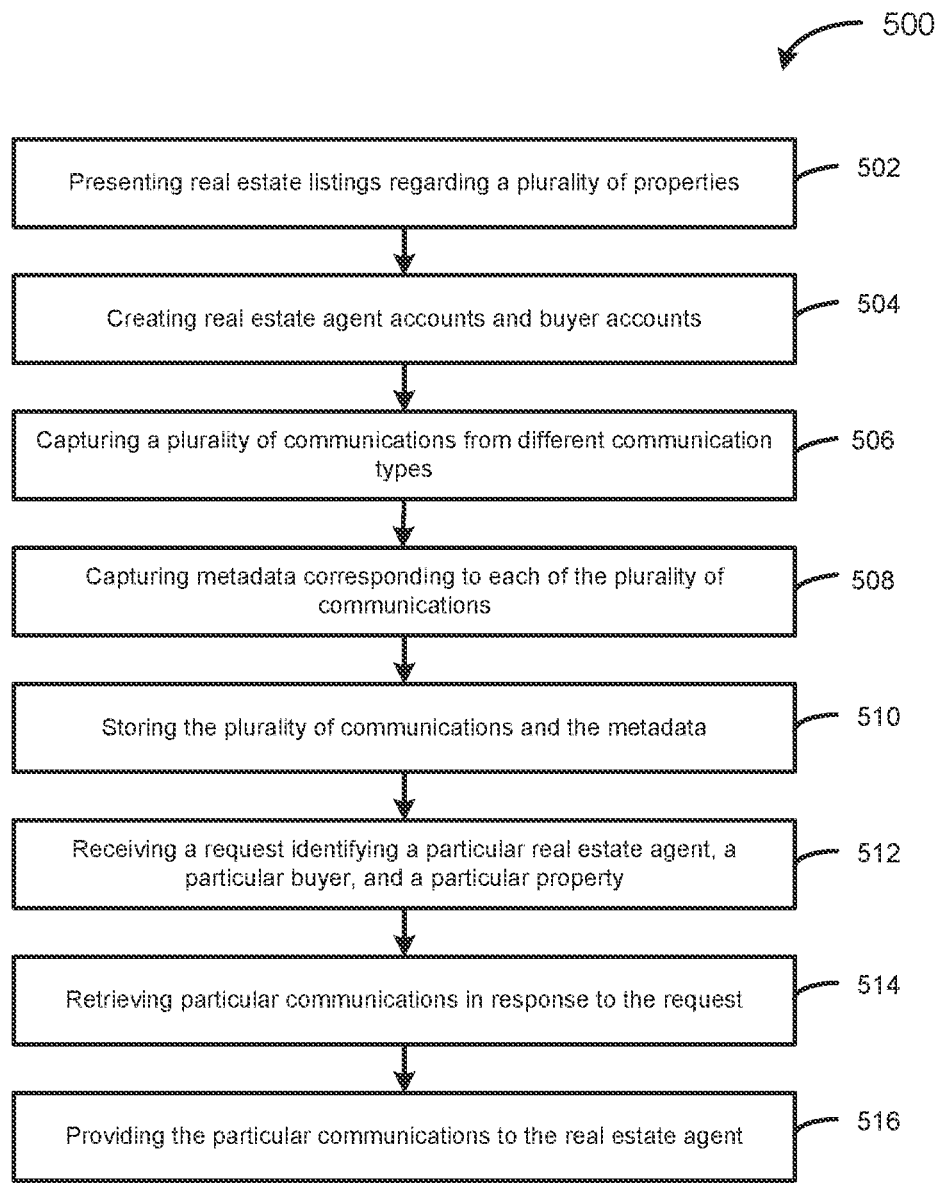
FIG. 5 depicts a flowchart of an example method of operation of a multi-mode communication management system according to some embodiments.

FIG. 5 depicts a flowchart 500 of an example method of operation of a multi-mode communication management system according to some embodiments.

In step 502, a multi-mode communication management system presents real estate listings regarding a plurality of properties to a plurality of buyers. Example screenshots of real estate listings are shown in FIG. 7. In some embodiments, a real estate listing module 312 presents the real estate listings.

In step 504, the multi-mode communication management system creates accounts for the plurality of buyers and a plurality of real estate agents. In some embodiments, a registration module 322 creates the accounts and stores the account information in respective buyer datastore 308 and agent datastore 306.

In step 506, the multi-mode communication management system captures a plurality of communications from different communication types between one or more of the plurality of buyers and one or more of the plurality of real estate agents regarding any of the real estate listings. In some embodiments, a multi-mode communication capture module 314 captures the communications.

In step 508, the multi-mode communication management system captures metadata corresponding to each of the plurality of communications, the metadata including at least identification of the one or more of the plurality of buyers and the one or more of the plurality of real estate agents involved in each of the communications. In some embodiments, a multi-mode communication capture module 314 captures the metadata.

In step 510, the multi-mode communication management system stores the plurality of communications and the metadata corresponding to each of the plurality of communications. In some embodiments, a management module 302 stores the communications and the metadata in a multi-mode communications datastore 310.

In step 512, the multi-mode communication management system receives a request, the request including identification of a particular real estate agent from the plurality of real estate agents, identification of a particular buyer of the plurality of buyers, and identification of a particular property of the plurality of properties. In some embodiments, a filter module 318 receives the request.

In step 514, the multi-mode communication management system retrieves particular communications from the multi-mode communication datastore in response to the request, the particular communications corresponding to the particular real estate agent, the particular buyer, and the particular property. In some embodiments, the filter module 318 retrieves the particular communications.

In step 516, the multi-mode communication management system provides the particular communications to the particular real estate agent. In some embodiments, a multi-mode communication output module 328 provides the particular communications to the particular real estate agent over a network 108.

Figure 6:
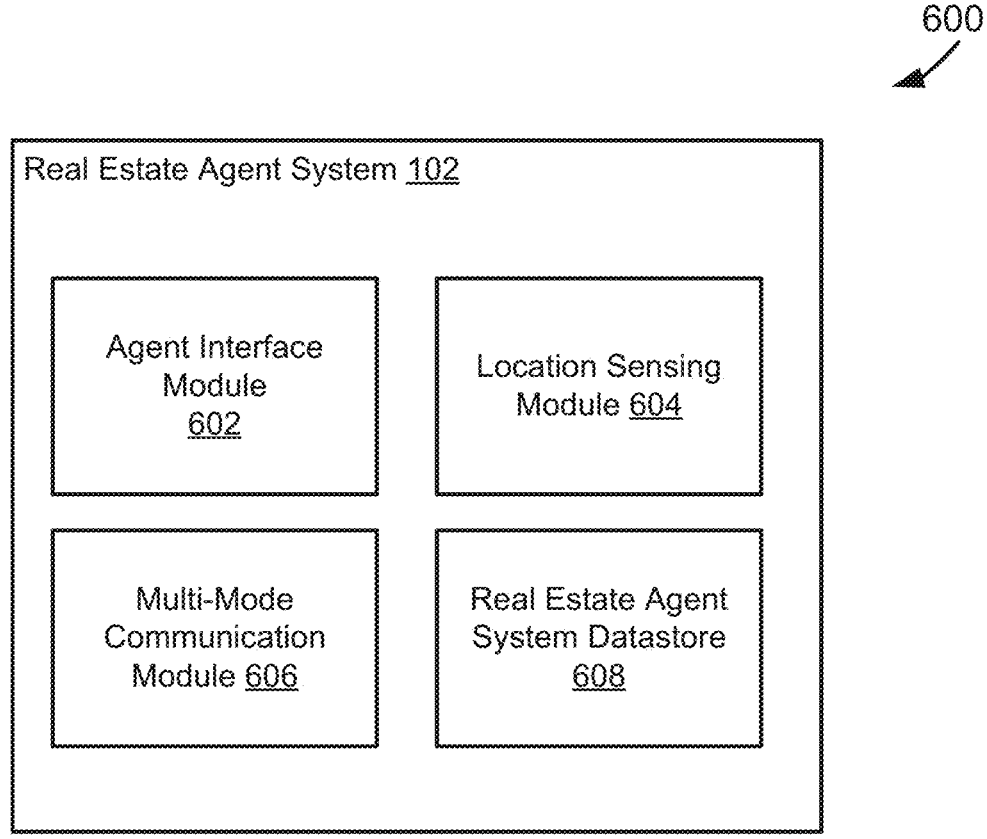
FIG. 6 depicts a block diagram of an example real estate agent system according to some embodiments.

FIG. 6 depicts a block diagram 600 of an example real estate agent system 102 according to some embodiments. In some embodiments, real estate agent system 102 includes an agent interface module 602, a location sensing module 604, a multi-mode communication module 606, and a real estate agent system datastore 608.

The agent interface module 602 may be configured to present real estate listings, receive agent input, search for particular communication information, edit documents, present multi-mode communications, and the like. In some embodiments, the agent interface module 602 may include a web browser or may use a web browser to display an interface. In some embodiments, the agent interface module 602 may comprise a mobile application configured to interact with multi-mode communication management systems, real estate agent systems, and/or buyer systems.

The location sensing module 604 may be configured to determine a geographic location of the real estate agent system 102. For example, location information may be used to match agents with buyers, confirm agent eligibility to represent particular properties, determine context information, and the like. In some embodiments, the location sensing module 604 may be implemented using GPS, Wi-Fi signals, and/or cellular signals.

The communication module 606 may be configured to send requests, transmit multi-mode communications, receive multi-mode communications, and/or otherwise provide communication with one or a plurality of systems. In some embodiments, the communication module 606 may be configured to encrypt and decrypt communications. The communication module 606 may send requests to and receive data from a system through a network or a portion of a network. Depending upon implementation-specific or other considerations, the communication module 606 may send requests and receive data through a connection, all or a portion of which may be a wireless connection. The communication module 606 may request and receive messages, and/or other communications from associated systems. Received data may be stored in the datastore 608.

FIG. 7 depicts a flowchart 700 of an example method of operation of a real estate agent system according to some embodiments.

In step 702, a real estate agent system 102 provides an agent registration request. For example, a real estate agent may input the agent registration request in a real estate system 102, and the real estate system 102 may transmit the request over a network 108. In some embodiments, an agent interface module 602 receives the input, and a communication module transmits the registration request. In step 704, the real estate agent system 102 receives a registration authentication message if the registration was successfully completed. Alternatively, the real estate agent system 102 may receive an error message if the registration was unsuccessful (e.g., indicating what caused the failure).

In step 706, the real estate agent system 102 provides an agent login request. For example, the real estate agent may input the agent login request in the real estate agent system 102, and the real estate agent system 102 may transmit the login request over the network 108. In some embodiments, the agent interface module 602 receives the input, and the communication module transmits the login request. In step 708, the real estate agent system 102 receives a login authentication message if the login was successfully completed. Alternatively, the real estate agent system 102 may receive an error message if the login was unsuccessful (e.g., indicating what caused the failure).

In step 710, the real estate agent system 102 presents a list of buyers. For example, the list of buyers may be based on a current location of the real estate agent, and the system 102 may present a list of buyers within a predetermined range of the real estate agent system 102 and/or a list of buyers interested in properties within a predetermined range of the real estate agent system 102. In some embodiments, the agent interface module 602 presents the list of buyers. It will be appreciated that the buyers may be presented in formats other than a list in some embodiments.

In step 712, the real estate agent system 102 communicates using different communication types with one or more buyers regarding one or more real estate listings. For example, the real estate agent system 102 may select a first buyer from the list and provide an email to the first buyer, select a second buyer from the list, and provide a text message to the second buyer, receive and respond to a video chat request from a third buyer, initiate a Skype communication session with a group of fourth buyers, and so forth. In some embodiments, communications are generated based on input received by the agent interface module 602, and transmitted by the communication module 606 over the network 108.

In step 714, the real estate agent system 102 receives filter attributes (or, "search criteria"). For example, the filter attributes may identify the real estate agent, one or more buyers, one or more properties, one or more communication types, one or more time durations, and the like. It will be appreciated that filter attributes may be based on any number of the attributes described herein (e.g., agent record attributes, buyer record attributes, communication record attributes, and the like). In some embodiments, the agent interface module 602 receives the filter attributes.

In step 716, the real estate agent system 102 provides the filter attributes. For example, the filter attributes may be provided to a multi-mode communication management system 106. In some embodiments, the communication module 606 provides the filter attributes over the network 108. In step 718, the real estate agent system 102 receives a package comprising one or more communications selected based on the filter attributes. For example, the package may comprise some or all of the communications with a particular buyer, and/or transcripts of some or all of the communications with the particular buyer. In some embodiments, the communication module 606 receives the package. In step 720, the real estate agent system 102 presents the package. For example, the interface module 602 may display video and image communications, playback audio communications, and so forth.

Figure 8:
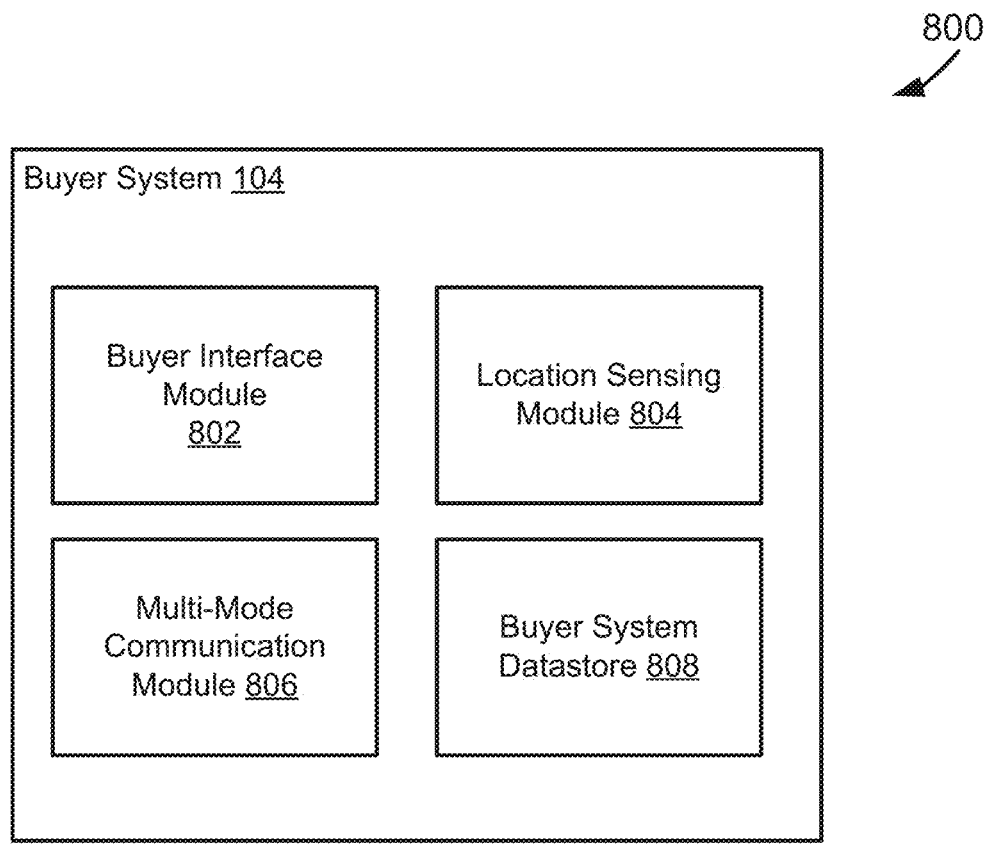
FIG. 8 depicts a block diagram of an example buyer system according to some embodiments.

FIG. 8 depicts a block diagram 800 of an example buyer system 104 according to some embodiments. In some embodiments, the buyer system 104 includes a buyer interface module 802, a location sensing module 804, a multi-mode communication module 806, and a buyer system datastore 808.

The buyer interface module 802 may be configured to present real estate listings, receive buyer input, search for particular properties and agents, and present multi-mode communications. In some embodiments, the buyer interface module 802 may include a web browser or may use a web browser to display an interface. In some embodiments, the buyer interface module 802 may comprise a mobile application configured to interact with multi-mode communication management systems, real estate agent systems, and/or other buyer systems.

The location sensing module 804 may be configured to determine a geographic location of the buyer system 104. For example, location information may be used to match buyers with agents, determine context information, and the like. In some embodiments, the location sensing module 804 may be implemented using GPS, Wi-Fi signals, and/or cellular signals.

The communication module 806 may be configured to send requests, transmit multi-mode communications, receive multi-mode communications, and/or otherwise provide communication with one or a plurality of systems. The communication module 806 may send requests to and receive data from a system through a network or a portion of a network. Depending upon implementation-specific or other considerations, the communication module 806 may send requests and receive data through a connection, all or a portion of which may be a wireless connection. The communication module 806 may request and receive messages, and/or other communications from associated systems. Received data may be stored in the buyer system datastore 808.

Figure 9:
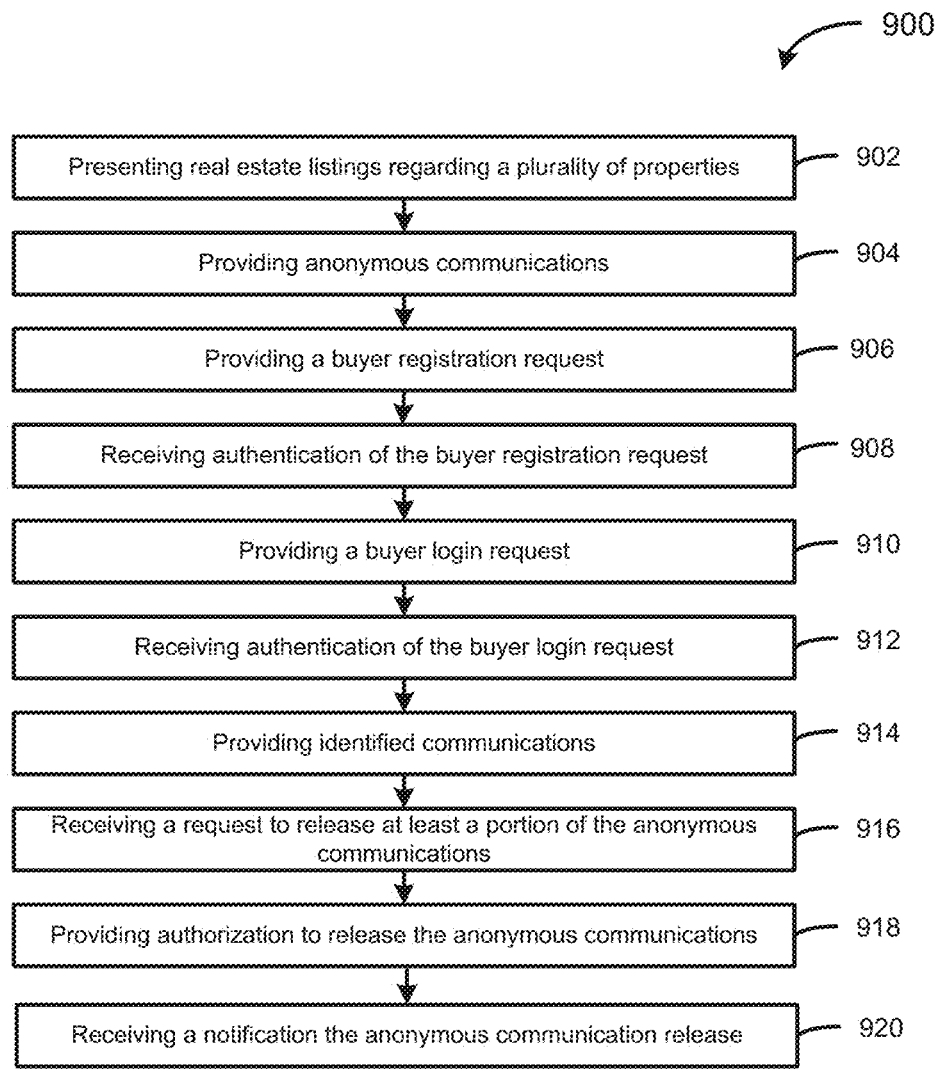
FIG. 9 depicts a flowchart of an example method of operation of a buyer system according to some embodiments.

FIG. 9 depicts a flowchart 900 of an example method of operation of a buyer system according to some embodiments.

In step 902, a buyer system 104 presents a plurality of real estate listings regarding a plurality of properties. Real estate listings may include, for example, a listing number, listing agent ID, address, property description, listing price, and the like. Example real estate listings are shown in FIG. 7. In some embodiments, the real estate listings are presented by a buyer interface module 802.

In step 904, the buyer system 104 provides anonymous communications. For example, the buyer system 104 may select a first agent associated with a first real estate listing and provide a chat message to the first agent while only revealing a screenname (e.g., "Guest," "Jrock5m" or the like), join a Skype communication session with a group of other buyers and a second agent, and so forth. In some embodiments, communications are generated based on input received by the buyer interface module 802, and transmitted by a communication module 806 over the network 108.

In step 906, the buyer system 104 provides a buyer registration request. For example, a buyer may input the buyer registration request in the buyer system 104, and the buyer system 104 may transmit the request over the network 108. In some embodiments, the buyer interface module 802 receives the input, and the communication module 806 transmits the registration request. In step 908, the buyer system 104 receives a buyer registration authentication message if the registration was successfully completed. Alternatively, the buyer system 104 may receive an error message if the registration was unsuccessful (e.g., indicating what caused the failure).

In step 910, the buyer system 104 provides a buyer login request. For example, the buyer may input the buyer login request in the buyer system 104, and the buyer system 104 may transmit the login request over the network 108. In some embodiments, the buyer interface module 802 receives the input, and the communication module 806 transmits the login request. In step 912, the buyer system 104 receives a login authentication message if the login was successfully completed. Alternatively, the buyer system 104 may receive an error message if the login was unsuccessful (e.g., indicating what caused the failure).

In step 914, the buyer system 104 provides identified communications. In some embodiments, identified communications may comprise communications that are not anonymous, e.g., include at least one attribute that may be used to identifier the buyer (e.g., name, contact information, etc.). For example, the buyer system 104 may select a first agent associated with a first real estate listing and provide an email to the first agent, select a second agent associated with a second real estate listing and provide a text message to the second agent, receive and respond to a video chat request from a third agent, join a Skype communication session with a group of other buyers and a fourth agent, and so forth. In some embodiments, communications are generated based on input received by the buyer interface module 802, and transmitted by a communication module 806 over the network 108.

In step 916, the buyer system 104 receives a request to release a portion of the anonymous communications. For example, during a closing on a property, the buyer may be prompted to release prior anonymous communication for inclusion in related documents, and/or satisfy regulatory requirements. In some embodiments, the request may be received by the communication module 806 over the network 108. In step 918, the buyer system 104 provides authorization to release at least a portion of the anonymous communications. For example, the buyer interface module 802 may receive input indicating the authorization, and the communication module 806 may transmit the authorization over the network 108. In step 920, the buyer system 104 receives a notification the anonymous communications have been released. In some embodiments, the communication module 806 may receive the notification over the network 108, and the buyer interface module 802 may present the notification.

FIG. 10 depicts example real estate listing records 1002 and 1004 according to some embodiments. The listing records 1002 and 1004 include a plurality of attribute fields, such as Listing ID, Listing Agent ID, property address, number of structure, living space size, listing price, and other information. It will be appreciated that some embodiments may include different attributes instead of, or in addition to, the attributes shown in FIG. 10.

FIG. 11 depicts example agent records 1102 and 1104 according to some embodiments. The agent records 1102 and 1104 include a plurality of attribute fields, such as Agent ID, password, agent name, preferred contact mode, agent's office name, agent's phone number, and other information. It will be appreciated that some embodiments may include different attributes instead of, or in addition to, the attributes shown in FIG. 11.

FIG. 12 depicts example buyer records 1202 and 1204 according to some embodiments. The records 1202 and 1204 include a plurality of attribute fields, such as Buyer ID, password, buyer name, preferred contact mode, buyer's correspondence address, buyer's phone number, and other information. As with other records described herein, the record data may be stored as individual fields, or as one large JSON object, or as XML, or in some other format.

FIG. 13 depicts example communication records 1302-1308 according to some embodiments. Each of the records 1302-1308 may correspond to a communication, and may include copies of, or pointers in memory to, the various communications between users (buyers, agents) of system 106, a communications timestamp, the Buyer ID, Agent ID of the users involved in each communication, and the Listing ID of the property that the correspondence concerned. Thus, for example, communications information can include copies or pointers to each text, e-mail, video tour, or whatever type of communications was exchanged, and references back to buyer attribute information, agent attribute information, and real estate listing information.

Figure 14:
FIG. 14 depicts an example of a screenshot presented by a multi-mode communication management system to buyers to view listings of properties according to some embodiments.

FIG. 14 depicts an example of a screenshot presented by a multi-mode communication management system to buyers to view listings of properties according to some embodiments. Screenshot 1400 includes a portion 1402 where the buyer may provide criteria to limit a search, such as by price, size, days on market, number of bedrooms and bathrooms, year build, property type, environmental factors, neighborhood name, etc. Portion 1404 presents listings that meet the buyers search criteria.

Figure 15:
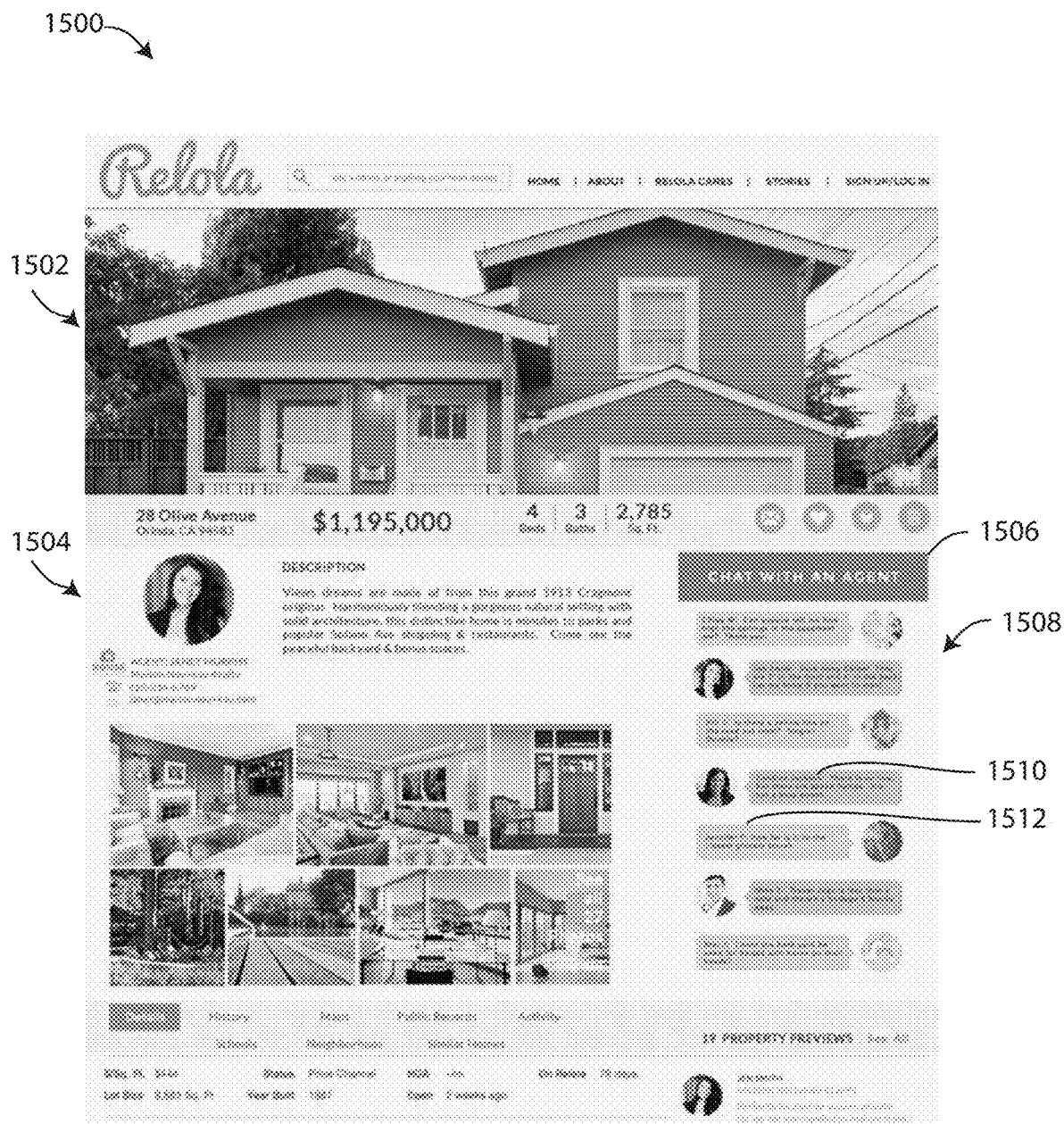
FIG. 15 depicts an example of a screenshot presented by a multi-mode communication management system to a buyer that has selected a listed property according to some embodiments.

FIG. 15 depicts an example of a screenshot 1500 presented by a multi-mode communication management system 106 to a buyer that has selected a listed property according to some embodiments. Screenshot 1500 shows a first portion 1502 having listing detail, a second portion 1504 showing the listing agent and their contact information, a button 1506 labeled "Chat With An Agent", and a view 1508 of chats between buyers and the property's agent. While the agents full name is shown, for example as the agent's name 1510, only the buyer's Buyer ID is shown, for example as Buyer ID 1512.

Although it is not illustrated, other pages or buttons provide for different types of communications, including and not limited to e-mails between buyer and agents or experts, e-mails or messages between buyers and agent or experts, group chats between buyers, agents, and experts, and video yours by agents to one or more buyers.

Figure 16:
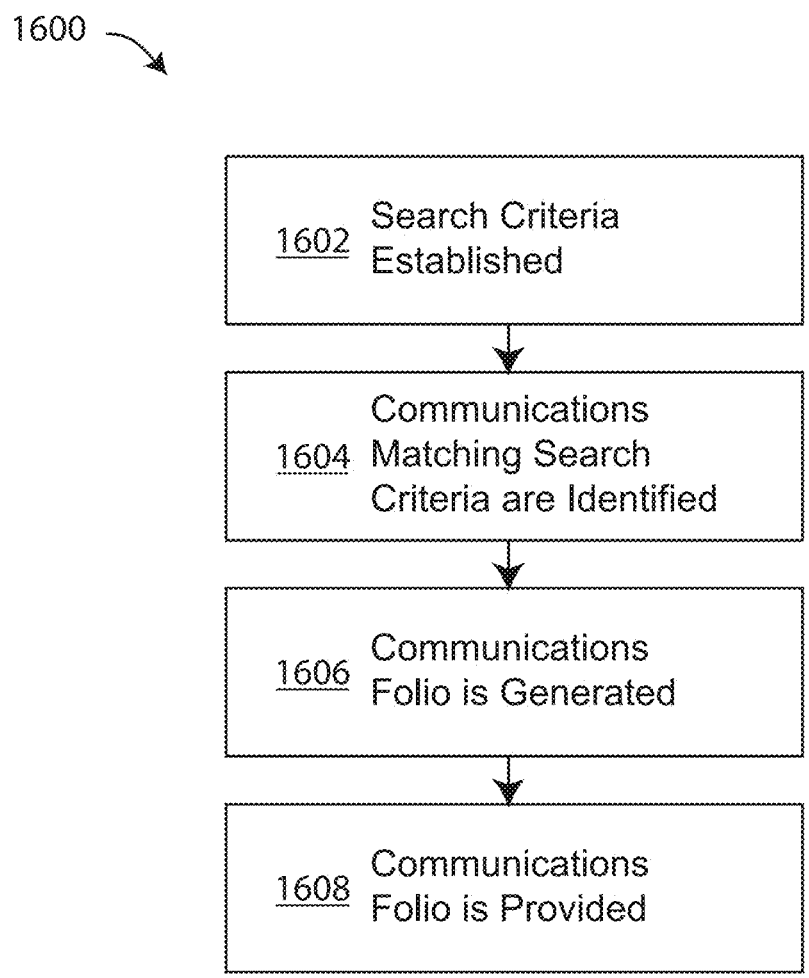
FIG. 16 depicts a flow chart of an example method of obtaining a summary of communications (e.g., a "communications folio") using a multi-mode communication management system according to some embodiments.

FIG. 16 depicts a flow chart 1600 of an example method of obtaining a summary of communications (e.g., a "communications folio") using a multi-mode communication management system 106 according to some embodiments. Specifically, system 106 may be configured to establish a search criteria, as indicated in step 1602 which may for example and without limitation, occur by the user of the system providing search criteria to the system, by the user of the system selecting from among system provided search criteria, or by the system determining search criteria based on options available to the user. The search criteria may, for example and without limitation, be one criteria or a combination of criteria, where the criteria may be, for example, and without limitation, a specific recipient, a specific topic, or a date range.

Next, as shown in step 1604 the system searches through system memory for all communications meeting the search criteria. As noted herein, the communications may be one form of communications, such as E-mails, or may include several forms of communication, such as E-mails and video chats. Next, as shown in step 1606, the system forms a communications folio from the identified communications. The communications folio may be, for example and without limitation, one or more files of copies or links to communications meeting the search criteria, Lastly, as shown in step 1608, the system provides the communications folio.

Figure 17:
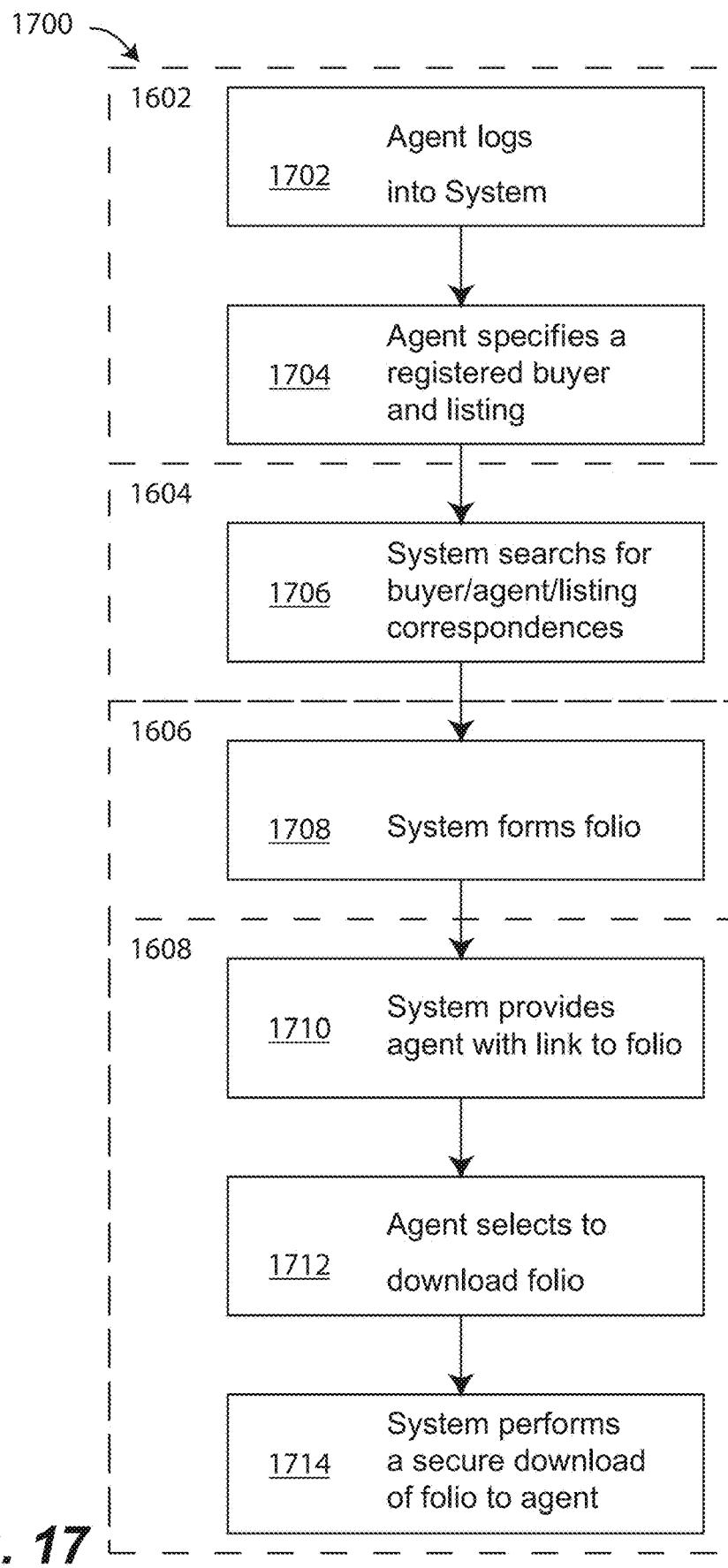
FIG. 17 depicts a flow chart of an example method of obtaining a communications folio according to some embodiments.

FIG. 17 depicts a flow chart 1700 of an example method of obtaining a communications folio according to some embodiments. The method of flowchart 1700 is generally similar to the method of flowchart 1600, except as explicitly stated.

As shown in step 1702, the agent first logs into system 106. Next, as shown in step 1704, the agent specifies the buyer and property from a real estate listing. Next, as shown in step 1706, system 106 searches communications records 336 to find some or all communications regarding the listed property and between the buyer and agent. Next, as shown in step 1708, system 106 generates a communications folio. The communications folio may be a single file that uses a standard password protected archive format (including, but not limited to .zip, .gz, rar). In certain embodiments, the agent will be able to select a format.

Next, as shown in step 1710, the system provides a link to the communications folio. Next, as shown in Step 1712, the agent selects the download button, and as shown in step 1714, system 106 provides the communications folio to the agent's device, such as the device performing the functionality of the real estate agent system 102. In some embodiments, the download is performed via SSL.

Figure 18:
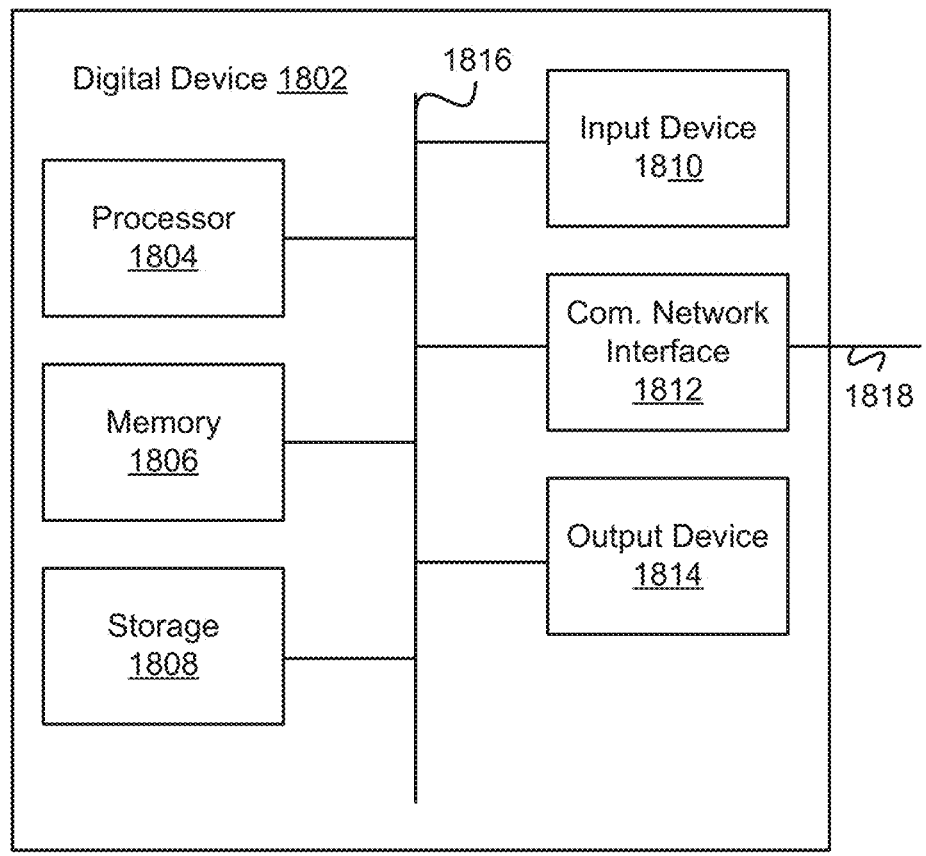
FIG. 18 depicts a block diagram of an example computing device according to some embodiments.

FIG. 18 depicts a block diagram 1800 of an example computing device 1802 according to some embodiments. Any of the agent systems 102, the buyer systems 104, the multi-mode communication management system 106, and the communication network 108 may comprise an instance of the digital device 1802. The digital device 1802 comprises a processor 1804, memory 1806, storage 1808, an input device 1810, a communication network interface 1812, and an output device 1814 communicatively coupled to a communication channel 1816. The processor 1804 is configured to execute executable instructions (e.g., programs). In some embodiments, the processor 1804 comprises circuitry or any processor capable of processing the executable instructions.

The memory 1806 stores data. Some examples of memory 1806 include storage devices, such as RAM, ROM, RAM cache, virtual memory, etc. In various embodiments, working data is stored within the memory 1806. The data within the memory 1806 may be cleared or ultimately transferred to the storage 1808.

The storage 1808 includes any storage configured to retrieve and store data. Some examples of the storage 1808 include flash drives, hard drives, optical drives, and/or magnetic tape. Each of the memory system 1806 and the storage system 1808 comprises a computer-readable medium, which stores instructions or programs executable by processor 1804.

The input device 1810 is any device that inputs data (e.g., mouse and keyboard). The output device 1814 outputs data (e.g., a speaker or display). It will be appreciated that the storage 1808, input device 1810, and output device 1814 may be optional. For example, the routers/switchers may comprise the processor 1804 and memory 1806 as well as a device to receive and output data (e.g., the communication network interface 1812 and/or the output device 1814).

The communication network interface 1812 may be coupled to a network (e.g., network 108) via the link 1818. The communication network interface 1812 may support communication over an Ethernet connection, a serial connection, a parallel connection, and/or an ATA connection. The communication network interface 1812 may also support wireless communication (e.g., 1102.11 a/b/g/n, WiMax, LTE, WiFi). It will be apparent that the communication network interface 1812 may support many wired and wireless standards.

It will be appreciated that the hardware elements of the digital device 1802 are not limited to those depicted in FIG. 18. A digital device 1802 may comprise more or less hardware, software and/or firmware components than those depicted (e.g., drivers, operating systems, touch screens, biometric analyzers, or the like). Further, hardware elements may share functionality and still be within various embodiments described herein. In one example, encoding and/or decoding may be performed by the processor 1804 and/or a co-processor located on a GPU (i.e., NVidia).

It will be appreciated that a "module," "system," and/or "datastore" may comprise software, hardware, firmware, and/or circuitry. In one example, one or more software programs comprising instructions capable of being executable by a processor may perform one or more of the functions of the modules, datastore, or systems described herein. In another example, circuitry may perform the same or similar functions. Alternative embodiments may comprise more, less, or functionally equivalent modules, systems, or datastore, and still be within the scope of present embodiments. For example, the functionality of the various systems, modules, and/or datastores may be combined or divided differently.

The present invention(s) are described above with reference to example embodiments. It will be apparent to those skilled in the art that various modifications may be made and other embodiments may be used without departing from the broader scope of the present invention(s). Therefore, these and other variations upon the example embodiments are intended to be covered by the present invention(s).

The invention claimed is:

1. A system, comprising:
   one or more processors;
   a memory storing instructions, the instructions to configure the one or more processors to:
   present real estate listings regarding a plurality of properties to a plurality of buyers;
   create accounts for the plurality of buyers and create accounts for a plurality of real estate agents;
   capture a plurality of communications of different communication types performed between one or more of the plurality of buyers and one or more of the plurality of real estate agents regarding any of the real estate listings, the plurality of buyers including at least one anonymous buyer, the plurality of communication comprising anonymous communication, the different communication types comprising at least two of a text message communication type, email communication type, group chat communication type, video chat communication type, interactive video tour communication type, the chat message type or a phone communication type, properties of each of the plurality of communication including an anonymity status of anonymous or non-anonymous;
   capture metadata corresponding to each of the plurality of communications, the metadata including any of metadata embedded within captured communications or generated based on captured communication and the one or more of the plurality of buyers and the one or more of the plurality of real estate agents involved in each of the communications;
store the plurality of communications and the metadata corresponding to each of the plurality of communications in a datastore;
receive, from a particular real estate agent, a request for an identification of a particular anonymous buyer of the plurality of buyers, the request including an identification of a particular property, a pointer value indicating a stored location of the particular anonymous communication of the plurality of communication;
confirm permission to release the identification of the particular anonymous buyer of the plurality of buyers;
in response to the request for the identification of the particular anonymous buyer of the plurality of buyers,
update the anonymity status of each of the plurality of communication associated with the particular anonymous buyer to non-anonymous; and
assign future communication between the particular anonymous buyer and the particular real estate agent with the anonymity status of non-anonymous;
generate a communication record table including a plurality of entries, the plurality of entries including at least one entry corresponding to the particular anonymous buyer of the plurality of buyers, each of the plurality of entries include specific values indicating a type of communication, a timestamp, an identification of a buyer, an identification of a real estate agent, and an identification of a property, and a pointer value indicating a stored location of a communication of the plurality of communications in the datastore;
receive a request for a single encrypted file, the request for the single encrypted file including identification of the particular real estate agent, identification of the particular anonymous buyer, and identification of the particular property of the plurality of properties; and
in response to the request for the single encrypted file,
retrieve particular communications from the datastore by referring to particular entries of the communication record table corresponding to the particular real estate agent, the particular anonymous buyer, and the particular property and accessing particular locations of the datastore indicated by pointer values in the particular entries, the particular communications including a communication of a first communication type and a communication of a second communication type different from the first communication type, wherein at least one of the first communication type or the second communication type is a chat message type;
generate the single encrypted file including a folio of the particular communications, the folio including a manifest file having links to the particular communications in the folio, respectively; and
provide the single encrypted file to the particular real estate agent to facilitate real estate purchases.

2. The system of claim 1, wherein the different communication types comprise different communication protocols.

3. The system of claim 1, wherein the anonymous communication between the particular real estate agent and the particular anonymous buyer is sent without revealing the identification of the particular buyer to the particular real estate agent.

4. The system of claim 1, wherein the instructions further configure the one or more processors to transcribe at least a portion of the particular communications and to provide the transcription to the particular real estate agent.

5. The system of claim 1, wherein the request for the single encrypted file is generated in response to user input received from the particular real estate agent.

6. The system of claim 1, wherein the request for the single encrypted file is generated in response to a trigger event without requiring user input.

7. The system of claim 6, wherein the trigger event comprises a real estate transaction event.

8. A method, comprising:
presenting, by a multi-mode communication management system, real estate listings regarding a plurality of properties to a plurality of buyers;
creating, by the multi-mode communication management system, accounts for the plurality of buyers and creating accounts for a plurality of real estate agents;
capturing, by the multi-mode communication management system, a plurality of communications of different communication types performed between one or more of the plurality of buyers and one or more of the plurality of real estate agents regarding any of the real estate listings, the plurality of buyers including at least one anonymous buyer, the plurality of communications comprising anonymous communication, the different communication types comprising at least two of a text message communication type, email communication type, group chat communication type, video chat communication type, interactive video tour communication type, the chat message type or a phone communication type, properties of each of the plurality of communication including an anonymity status of anonymous or non-anonymous;
capturing, by the multi-mode communication management system, metadata corresponding to each of the plurality of communications, the metadata including any of metadata embedded within captured communications or generated based on captured communication and the one or more of the plurality of buyers and the one or more of the plurality of real estate agents involved in each of the communications;
storing, by the multi-mode communication management system, the plurality of communications and the metadata corresponding to each of the plurality of communications;
receiving a request for an identification of a particular anonymous buyer of the plurality of buyers, the request including an identification of a particular property, a pointer value indicating a stored location of the particular anonymous communication of the plurality of communication;
confirming permission to release the identification of the particular anonymous buyer of the plurality of buyers;
in response to the request for the identification of the particular anonymous buyer of the plurality of buyers,
updating the anonymity status of each of the plurality of communication associated with the particular anonymous buyer to non-anonymous; and
assigning future communication between the particular anonymous buyer and a particular real estate agent with the anonymity status of non-anonymous;

generating, by the multi-mode communication management system, a communication record table including a plurality of entries, the plurality of entries including at least one entry corresponding to the particular anonymous buyer of the plurality of buyers, each of the plurality of entries include specific values indicating a type of communication, a timestamp, an identification of a buyer, an identification of a real estate agent, and an identification of a property, and a pointer value indicating a stored location of a communication of the plurality of communications in the datastore;

receiving a request for a single encrypted file, the request for the single encrypted file including identification of the particular real estate agent, identification of the particular anonymous buyer, and identification of the particular property of the plurality of properties;

in response to the request for the single encrypted file,
retrieving, by the multi-mode communication management system, particular communications from the multi-mode communication datastore by referring to particular entries of the communication record table corresponding to the particular real estate agent, the particular anonymous buyer, and the particular property and accessing particular locations of the multi-mode communication datastore indicated by pointer values in the particular entries, the particular communications including a communication of a first communication type and a communication of a second communication type different from the first communication type, wherein at least one of the first communication type or the second communication type is a chat message type;

generating the single encrypted file including a folio of the particular communications, the folio including a manifest file having links to the particular communications in the folio, respectively; and providing, by the multi-mode communication management system, the single encrypted file to the particular real estate agent to facilitate real estate purchases.

9. The method of claim 8, wherein the different communication types comprise different communication protocols.

10. The method of claim 8, wherein the anonymous communication between the particular real estate agent and the particular anonymous buyer is sent without revealing the identification of the particular buyer to the particular real estate agent.

11. The method of claim 8, further comprising transcribing at least a portion of the particular communications, and providing the transcription to the particular real estate agent.

12. The method of claim 8, wherein the request for the single encrypted file is generated in response to user input received from the real estate agent.

13. The method of claim 8, wherein the request for the single encrypted file is generated in response to a trigger event without requiring user input.

14. The method of claim 13, wherein the trigger event comprises a real estate transaction event.

15. A non-transitory computer readable medium comprising executable instructions, the instructions being executable by a processor to perform a method, the method comprising:

presenting real estate listings regarding a plurality of properties to a plurality of buyers;

creating accounts for the plurality of buyers and to create accounts for a plurality of real estate agents;

capturing a plurality of communications of different communication types performed between one or more of the plurality of buyers and one or more of the plurality of real estate agents regarding any of the real estate listings, the plurality of buyers including at least one anonymous buyer, the plurality of communication comprising anonymous communication, the different communication types comprising at least two of a text message communication type, email communication type, group chat communication type, video chat communication type, interactive video tour communication type, the chat message type or a phone communication type, properties of each of the plurality of communication including an anonymity status of anonymous or non-anonymous;

capturing metadata corresponding to each of the plurality of communications, the metadata including any of metadata embedded within captured communications or generated based on captured communication and the one or more of the plurality of buyers and the one or more of the plurality of real estate agents involved in each of the communications;

storing the plurality of communications and the metadata corresponding to each of the plurality of communications;

receiving a request for an identification of a particular anonymous buyer of the plurality of buyers, the request including an identification of a particular property, a pointer value indicating a stored location of the particular anonymous communication of the plurality of communication;

confirming permission to release the identification of the particular anonymous buyer of the plurality of buyers;

in response to the request for the identification of the particular anonymous buyer of the plurality of buyers, updating the anonymity status of each of the plurality of communication associated with the particular anonymous buyer to non-anonymous; and assigning future communication between the particular anonymous buyer and a particular real estate agent with the anonymity status of non-anonymous;

generating a communication record table including a plurality of entries, the plurality of entries including at least one entry corresponding to the particular anonymous buyer of the plurality of buyers, each of the plurality of entries include specific values indicating a type of communication, a timestamp, an identification of a buyer, an identification of a real estate agent, and an identification of a property, and a pointer value indicating a stored location of a communication of the plurality of communications in the datastore;

receiving a request for a single encrypted file, the request for the single encrypted file including identification of a particular real estate agent, identification of the particular anonymous buyer, and identification of a particular property of the plurality of properties;

in response to the request for the single encrypted file,
retrieving particular communications from the multi-mode communication datastore by referring to particular entries of the communication record table corresponding to the particular real estate agent, the particular anonymous buyer, and the particular property and accessing particular locations of the datastore indicated by pointer values in the particular entries, the particular communications including a communication of a first communication type and a communication of a second communication type different from the first communication type, wherein at least one of the first communication type or the second communication type is a chat message type;

generating the single encrypted file including a folio of the particular communications, the folio including a manifest file having links to the particular communications in the folio, respectively; and providing the single encrypted file to the particular real estate agent to facilitate real estate purchase.

16. A non-transitory article of manufacture tangibly embodying computer readable instructions, which when implemented, cause a computer to perform the steps of a method to manage multi-modal communications, the method, comprising:

presenting real estate listings regarding a plurality of properties to a plurality of buyers;

creating accounts for the plurality of buyers and to create accounts for a plurality of real estate agents;

capturing a plurality of communications of different communication types performed between one or more of the plurality of buyers and one or more of the plurality of real estate agents regarding any of the real estate listings, the plurality of buyers including at least one anonymous buyer, the plurality of communication comprising anonymous communication, the different communication types comprising at least two of a text message communication type, email communication type, group chat communication type, video chat communication type, interactive video tour communication type, the chat message type or a phone communication type properties of each of the plurality of communication including an anonymity status of anonymous or non-anonymous;

capturing metadata corresponding to each of the plurality of communications, the metadata including any of metadata embedded within captured communications or generated based on captured communication and the one or more of the plurality of buyers and the one or more of the plurality of real estate agents involved in each of the communications;

storing the plurality of communications and the metadata corresponding to each of the plurality of communications;

receiving a request for an identification of a particular anonymous buyer of the plurality of buyers, the request including an identification of a particular property, a pointer value indicating a stored location of the particular anonymous communication of the plurality of communication;

confirming permission to release the identification of the particular anonymous buyer of the plurality of buyers;

in response to the request for the identification of the particular anonymous buyer of the plurality of buyers, updating the anonymity status of each of the plurality of communication associated with the particular anonymous buyer to non-anonymous; and assigning future communication between the particular anonymous buyer and a particular real estate agent with the anonymity status of non-anonymous;

generating a communication record table including a plurality of entries, the plurality of entries including at least one entry corresponding to the particular anonymous buyer of the plurality of buyers, each of the plurality of entries include specific values indicating a type of communication, a timestamp, an identification of a buyer, an identification of a real estate agent, and an identification of a property, and a pointer value indicating a stored location of a communication of the plurality of communications in the datastore;

receiving a request for a single encrypted file, the request for the single encrypted file including identification of a particular real estate agent, identification of the particular anonymous buyer, and identification of a particular property of the plurality of properties;

retrieving particular communications from the multi-mode communication datastore in response to the request, by referring to particular entries of the communication record table corresponding to the particular real estate agent, the particular anonymous buyer, and the particular property and accessing particular locations of the datastore indicated by pointer values in the particular entries, the particular communications including a communication of a first communication type and a communication of a second communication type different from the first communication type, wherein at least one of the first communication type or the second communication type is a chat message type;

generating the single encrypted file including a folio of the retrieved particular communications in response to the request, the folio including a manifest file having links to the particular communications in the folio, respectively; and providing the single encrypted file to the particular real estate agent to facilitate real estate purchase.

17. The system of claim 1, wherein the first communication type is a text communication type and the second communication type is a voice communication type, and the folio includes a transcript of the communication of the second communication type.

18. The method of claim 8, wherein the first communication type is a text communication type and the second communication type is a voice communication type, and the folio includes a transcript of the communication of the second communication type.

* * * * *